(12) United States Patent
Lee

(10) Patent No.: US 11,343,497 B2
(45) Date of Patent: *May 24, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/123,496

(22) Filed: Dec. 16, 2020

(65) Prior Publication Data

US 2021/0105470 A1 Apr. 8, 2021

Related U.S. Application Data

(63) Continuation of application No. 16/090,004, filed as application No. PCT/KR2017/003357 on Mar. 28, 2017, now Pat. No. 10,904,526.

(30) Foreign Application Priority Data

| Mar. 28, 2016 | (KR) | .................. | 10-2016-0036841 |
| Mar. 28, 2016 | (KR) | .................. | 10-2016-0036844 |
| Mar. 28, 2016 | (KR) | .................. | 10-2016-0036846 |

(51) Int. Cl.
*H04N 19/00* (2014.01)
*H04N 19/12* (2014.01)
(Continued)

(52) U.S. Cl.
CPC .......... *H04N 19/12* (2014.11); *H04N 19/119* (2014.11); *H04N 19/124* (2014.11);
(Continued)

(58) Field of Classification Search
CPC .... H04N 19/12; H04N 19/119; H04N 19/124; H04N 19/159; H04N 19/176; H04N 19/198; H04N 19/30
See application file for complete search history.

(56) References Cited

U.S. PATENT DOCUMENTS

| 2011/0200112 A1 | 8/2011 | Won et al. |
| 2012/0033731 A1 | 2/2012 | Yamamoto et al. |

(Continued)

FOREIGN PATENT DOCUMENTS

| CN | 103004194 A | 3/2013 |
| CN | 103096066 A | 5/2013 |

(Continued)

OTHER PUBLICATIONS

Kiho Choi et al., "Adaptive Multiple Transform for Chroma", Document: JVET-B0033, Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-6.

(Continued)

*Primary Examiner* — Zhihan Zhou
(74) *Attorney, Agent, or Firm* — IP Legal Services, LLC

(57) ABSTRACT

A method of processing video signal according to a present invention comprises determining a transform set for a current block comprising a plurality of transform type candidates, determining a transform type of the current block from the plurality of transform type candidates and performing an inverse transform for the current block based on the transform type of the current block.

7 Claims, 18 Drawing Sheets

(51) Int. Cl.
  *H04N 19/176* (2014.01)
  *H04N 19/119* (2014.01)
  *H04N 19/124* (2014.01)
  *H04N 19/159* (2014.01)
  *H04N 19/196* (2014.01)
  *H04N 19/30* (2014.01)
(52) U.S. Cl.
  CPC ......... *H04N 19/159* (2014.11); *H04N 19/176* (2014.11); *H04N 19/198* (2014.11); *H04N 19/30* (2014.11)

(56) References Cited

U.S. PATENT DOCUMENTS

| | | | |
|---|---|---|---|
| 2012/0163473 A1* | 6/2012 | Laroche | H04N 19/61 375/240.24 |
| 2013/0064293 A1 | 3/2013 | Song et al. | |
| 2013/0101027 A1* | 4/2013 | Narroschke | H04N 19/182 375/240.03 |
| 2014/0105279 A1 | 4/2014 | Hattori | |
| 2014/0254674 A1 | 9/2014 | Lee et al. | |
| 2014/0254675 A1* | 9/2014 | Lee | H04N 19/593 375/240.12 |
| 2014/0269915 A1 | 9/2014 | Lee et al. | |
| 2014/0286400 A1 | 9/2014 | Joshi et al. | |
| 2014/0286412 A1 | 9/2014 | Joshi et al. | |
| 2014/0286413 A1 | 9/2014 | Joshi et al. | |
| 2014/0314142 A1 | 10/2014 | Oh et al. | |
| 2014/0348235 A1 | 11/2014 | Yamamoto et al. | |
| 2015/0139306 A1 | 5/2015 | Lee et al. | |
| 2015/0139307 A1 | 5/2015 | Lee et al. | |
| 2015/0229925 A1 | 8/2015 | Won et al. | |
| 2015/0229948 A1* | 8/2015 | Puri | H04N 19/91 375/240.03 |
| 2015/0249828 A1* | 9/2015 | Rosewarne | H04N 19/136 375/240.02 |
| 2015/0256840 A1 | 9/2015 | Sato | |
| 2015/0312570 A1 | 10/2015 | Song et al. | |
| 2015/0326883 A1* | 11/2015 | Rosewarne | H04N 19/136 375/240.18 |
| 2016/0156934 A1 | 6/2016 | Lee et al. | |
| 2016/0219290 A1* | 7/2016 | Zhao | H04N 19/60 |
| 2016/0227253 A1* | 8/2016 | Sato | H04N 19/593 |
| 2016/0241886 A1 | 8/2016 | Yamamoto et al. | |
| 2016/0261866 A1 | 9/2016 | Oh et al. | |
| 2016/0261867 A1 | 9/2016 | Oh et al. | |
| 2017/0026643 A1 | 1/2017 | Lee et al. | |
| 2017/0026644 A1 | 1/2017 | Lee et al. | |
| 2017/0099502 A1 | 4/2017 | Lee et al. | |
| 2017/0099503 A1 | 4/2017 | Lee et al. | |
| 2017/0099504 A1 | 4/2017 | Lee et al. | |
| 2017/0118472 A1 | 4/2017 | Song et al. | |
| 2017/0150156 A1* | 5/2017 | Zhang | G06F 17/147 |
| 2017/0150176 A1* | 5/2017 | Zhang | G06F 17/147 |
| 2017/0150183 A1* | 5/2017 | Zhang | H04N 19/587 |
| 2017/0188047 A1 | 6/2017 | Won et al. | |
| 2017/0188048 A1 | 6/2017 | Won et al. | |
| 2017/0223380 A1 | 8/2017 | Lee et al. | |
| 2017/0251221 A1 | 8/2017 | Yamamoto et al. | |
| 2018/0063532 A1 | 3/2018 | Oh et al. | |
| 2018/0098068 A1 | 4/2018 | Rosewarne et al. | |
| 2018/0167625 A1 | 6/2018 | Sato | |
| 2018/0249173 A1 | 8/2018 | Yamamoto et al. | |
| 2018/0309994 A1 | 10/2018 | Oh et al. | |
| 2018/0332285 A1 | 11/2018 | Lee et al. | |
| 2019/0268613 A1 | 8/2019 | Sato | |
| 2019/0387229 A1 | 12/2019 | Oh et al. | |
| 2021/0160501 A1 | 5/2021 | Oh et al. | |
| 2021/0160502 A1 | 5/2021 | Oh et al. | |
| 2021/0160503 A1 | 5/2021 | Oh et al. | |
| 2021/0168367 A1 | 6/2021 | Oh et al. | |

FOREIGN PATENT DOCUMENTS

| | | |
|---|---|---|
| CN | 103731668 A | 4/2014 |
| CN | 104378633 A | 2/2015 |
| CN | 104871539 A | 8/2015 |
| JP | 2015-173505 A | 10/2015 |
| KR | 10-2014-0077928 A | 6/2014 |
| KR | 10-2014-0119823 A | 10/2014 |
| KR | 10-2015-0004484 A | 1/2015 |
| KR | 10-2015-0050559 A | 5/2015 |
| KR | 10-2015-0083826 A | 7/2015 |
| WO | 2014/160700 A1 | 10/2014 |
| WO | 2015/053115 A1 | 4/2015 |

OTHER PUBLICATIONS

VIDEO/JVET, "Algorithm Description of Joint Exploration Test Model 1 (JEM 1)", Document: N15790, ISO/IEC JTC1/SC29/WG11/N15790, Oct. 2015, Geneva, CH.

Jianle Chen et al., "Algorithm Description of Joint Exploration Test Model 2", Document: JVET-B1001_v3, Joint Video Exploration Team (JVET) of ITU-T SG 16 WP 3 and ISO/IEC JTC 1/SC 29/WG 11, 2nd Meeting: San Diego, USA, Feb. 20-26, 2016.

Kiho Choi et al., "Adaptive Multiple Transform for Chroma", Document: JVET-B0033, Joint Video Exploration Team (JVET) of ITU-T SG 16 WP 3 and ISO/IEC JTC 1/SC 29/WG11, 2nd Meeting: San Diego, USA, Feb. 20-26, 2016.

Jaeil Kim et al., "Efficient signaling of transform skipping mode", Document: JCTVC-H0259_r1, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-5.

European Patent Office, European Search Report of corresponding EP Patent Application No. 17775794.5, dated Jan. 29, 2020.

Vivienne Sze et al., "High Efficiency Video Coding (HEVC)", Algorithms and Architectures, Springer International Publishing, Switzerland, 2014.

Jie Zhao et al., "De-quantization and scaling for next generation containers", Document: JVET-B0054, Joint Video Exploration Team (JVET) of ITU-T SG 16 WP 3 and ISO/IEC JTC 1/SC 29/WG 11, 2nd Meeting: San Diego, USA, Feb. 20-26, 2016.

State Intellectual Property Office of People's Republic of China, Office Action of corresponding CN Patent Application No. 201780020638.3, dated Sep. 27, 2020.

China National Intellectual Property Administration, Office Action of corresponding CN Patent Application No. 201780020638.3, dated Apr. 2, 2021.

China National Intellectual Property Administration, Notice of Allowance of corresponding CN Patent Application No. 201780020638.3, dated Jan. 13, 2022.

\* cited by examiner

FIG. 11

| P(i,j)+h | P(i,j)-h | P(i,j)+h | P(i,j)+f | P(i,j)-h | P(i,j)-f |
|---|---|---|---|---|---|
| P(i,j)+f | P(i,j)-f | | | | | index 0     index 1     index 2     index 3

| CTU$_0$ Use (1, 2, 1) filter | CTU$_1$ Use (1, 3, 6, 3, 1) filter | ... | CTU$_{n-1}$ Use (1, 3, 6, 3, 1) filter |
| --- | --- | --- | --- |
| CTU$_n$ Use (1, 2, 1) filter | ... | ... | CTU$_{2n-1}$ Use (1, 2, 1) filter |
| ... | ... | ... | ... |
| CTU$_{(k-1)n}$ Use (1, 2, 1) filter | ... | ... | CTU$_{kn-1}$ Use (1, 3, 6, 3, 1) filter |

N×2N

2N×N

METHOD AND APPARATUS FOR PROCESSING VIDEO SIGNAL

CROSS REFERENCE TO RELATED APPLICATIONS

This application is a Continuation of U.S. patent application Ser. No. 16/090,004 (filed on Sep. 28, 2018), which is a National Stage Patent Application of PCT International Patent Application No. PCT/KR2017/003357 (filed on Mar. 28, 2017) under 35 U.S.C. § 371, which claims priority to Korean Patent Application Nos. 10-2016-0036841 (filed on Mar. 28, 2016), 10-2016-0036844 (filed on Mar. 28, 2016), and 10-2016-0036846 (filed on Mar. 28, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for hierarchically partitioning a coding block in encoding/decoding a video signal.

An object of the present invention is intended to provide a method and an apparatus for selectively performing an inverse transform for an encoding/decoding target block in encoding/decoding a video signal.

An object of the present invention is intended to provide a method and an apparatus for adaptively determining a transform type according to an encoding/decoding target block in inverse transforming the encoding/decoding target block.

An object of the present invention is intended to provide a method and an apparatus for deriving a quantization parameter residual value according to a characteristic of an encoding/decoding target block in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine a transform set comprising a plurality of transform type candidates for a current block, determine a transform type of the current block from the plurality of transform type candidates, and perform an inverse transform for the current block based on the transform type of the current block.

In the method and the apparatus for decoding a video signal according to the present invention, the transform type of the current block may be adaptively selected from the plurality of transform type candidates according to whether the current block satisfies a predetermined condition.

In the method and the apparatus for decoding a video signal according to the present invention, the predetermined condition may be adaptively determined according to a size of the current block.

In the method and the apparatus for decoding a video signal according to the present invention, the inverse transform may comprise a horizontal direction transform and a vertical direction transform for the current block, and the transform set may comprise a first transform set for the horizontal direction transform and a second transform set for the vertical direction transform.

In the method and the apparatus for decoding a video signal according to the present invention, the transform set may be specified by index information obtained from a bitstream.

In the method and the apparatus for decoding a video signal according to the present invention, the transform set may be determined based on a transform set of a block which has a same or a similar prediction mode as the current block among blocks decoded previously to the current block.

In the method and the apparatus for decoding a video signal according to the present invention, the method and the apparatus may decode information indication whether the inverse transform is skipped for the current block, and determine whether to perform the inverse transform for the current block based on the information.

In the method and the apparatus for decoding a video signal according to the present invention, the information may comprise information indicating whether a horizontal direction inverse transform of the current block is skipped and information indicating whether a vertical direction inverse transform of the current block is skipped.

In the method and the apparatus for decoding a video signal according to the present invention, when the information indicates that the inverse-transform is skipped for the current block, at least one of a horizontal direction transform or a vertical direction transform may be skipped according to a shape of the current block.

A method and an apparatus for encoding a video signal according to the present invention may determine a transform set comprising a plurality of transform type candidates for a current block, determine a transform type of the current block from the plurality of transform type candidates and perform a transform for the current block based on the transform type of the current block.

In the method and the apparatus for encoding a video signal according to the present invention, the method and the apparatus may determine a quantization parameter residual value for the current block, determine a quantization parameter for the current block based on the quantization parameter residual value and perform a quantization for the current block based on the quantization parameter.

In the method and the apparatus for encoding a video signal according to the present invention, the quantization parameter residual value may be determined based on an average value related to the current block, and the average value may be determined based on prediction signal of the current block and a DC coefficient generated as a result of the transform.

In the method and the apparatus for encoding a video signal according to the present invention, the quantization parameter residual value may be determined by referring to a lookup table defining a mapping relationship between the average value and the quantization parameter residual value, and the lookup table may be determined based on at least one of a size, an intra prediction mode, a transform type or a pixel value of the current block.

The features briefly summarized above for the present invention are only illustrative aspects of the detailed description of the invention that follows, but do not limit the scope of the invention.

Advantageous Effects

According to the present invention, it is possible to enhance encoding/decoding efficiency through hierarchical/adaptive partitioning of a coding block.

According to the present invention, it is possible to enhance encoding/decoding efficiency by selectively performing an inverse transform for an encoding/decoding target block.

According to the present invention, it is possible to enhance encoding/decoding efficiency by adaptively determining a transform type for an encoding/decoding target block.

According to the present invention, it is possible to enhance encoding/decoding efficiency by deriving a quantization residual value according to a characteristic of an encoding/decoding target block.

The effects obtainable by the present invention are not limited to the above-mentioned effects, and other effects not mentioned can be clearly understood by those skilled in the art from the description below.

DESCRIPTION OF DRAWINGS

FIGS. 10 to 14 are views illustrating examples of an intra prediction pattern of a current block according to an embodiment of the present invention.

MODE FOR INVENTION

Figure 1:
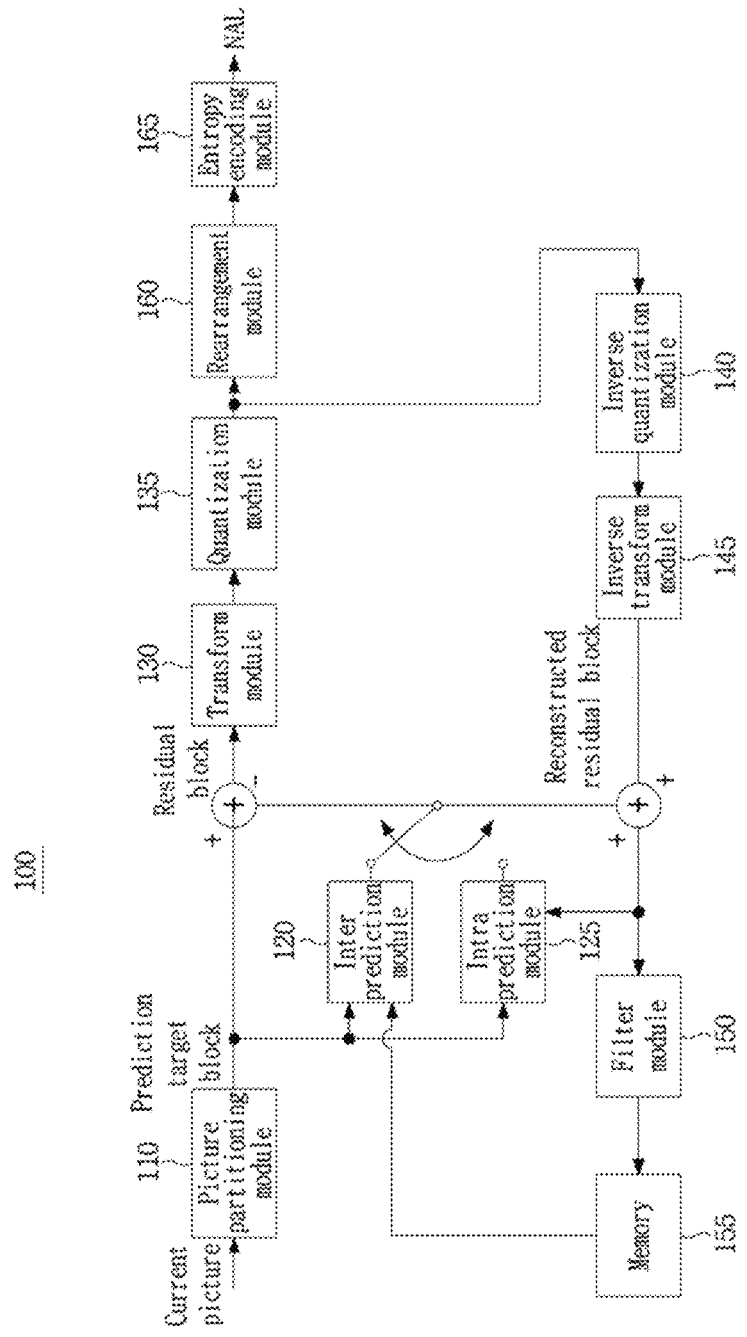
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
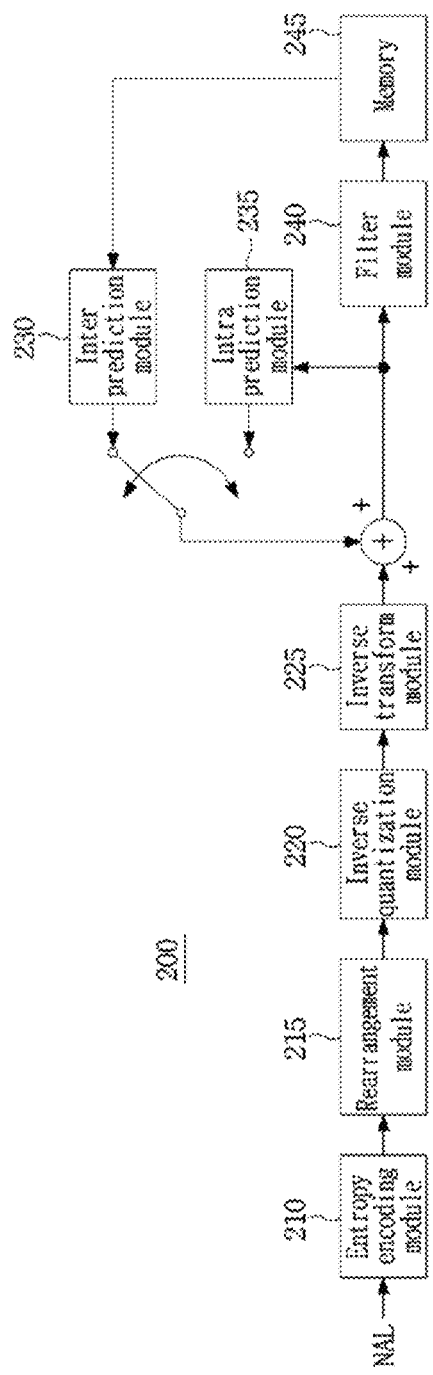
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

Figure 3:
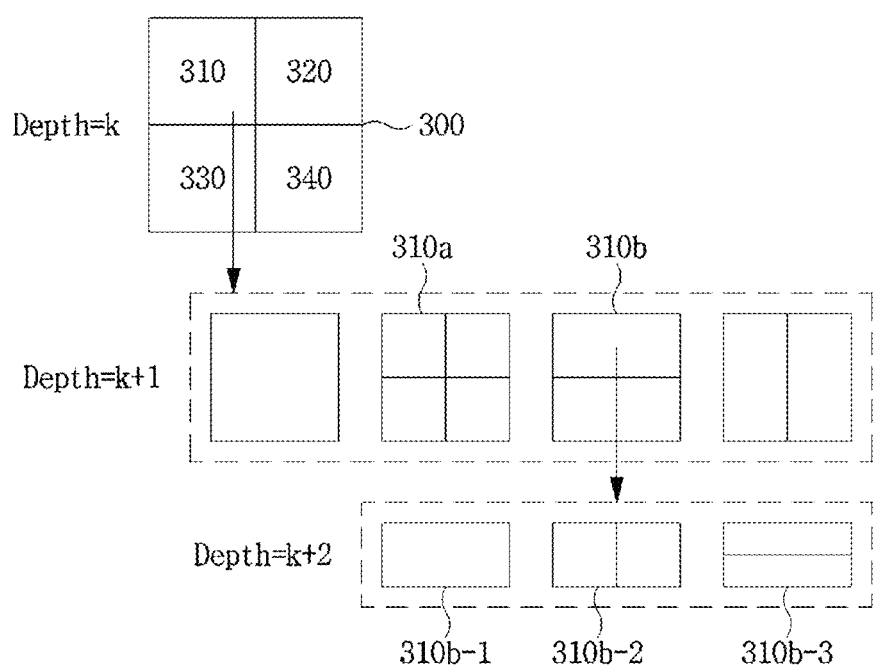
FIG. 3 is a view illustrating an example of hierarchically partitioning a coding block based on a tree structure according to an embodiment of the present invention.

FIG. 3 is a view illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Binary tree-based partitioning may be symmetrically or asymmetrically performed. The coding block partitioned based on the binary tree may be a square block or a non-square block, such as a rectangular shape. Binary tree-based partitioning may be performed on a coding block where quad tree-based partitioning is no longer performed. Quad tree-based partitioning may no longer be performed on the coding block partitioned based on the binary tree.

In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310*a* having the half width and the half height of the second coding block, and the partition depth of the third coding block 310*a* may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

Figure 4:
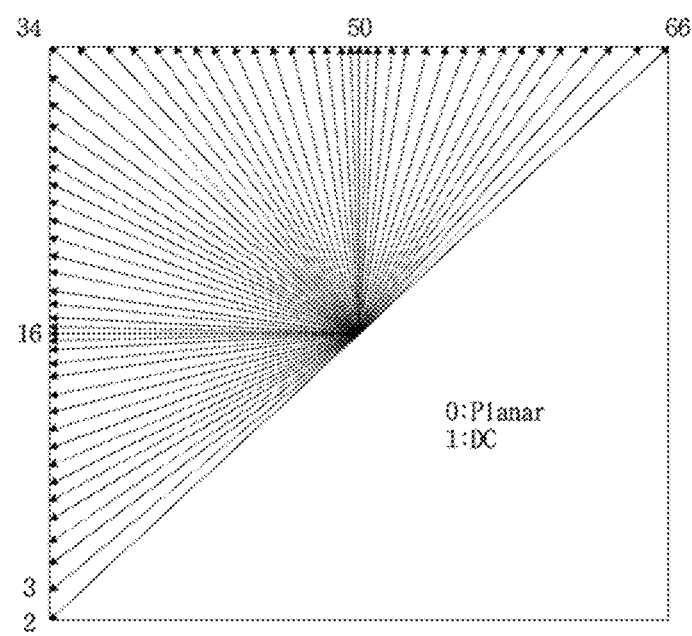
FIG. 4 is a view illustrating types of pre-defined intra prediction modes for a device for encoding/decoding a video according to an embodiment of the present invention.

FIG. 4 is a view illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

FIG. 4 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

Figure 5:
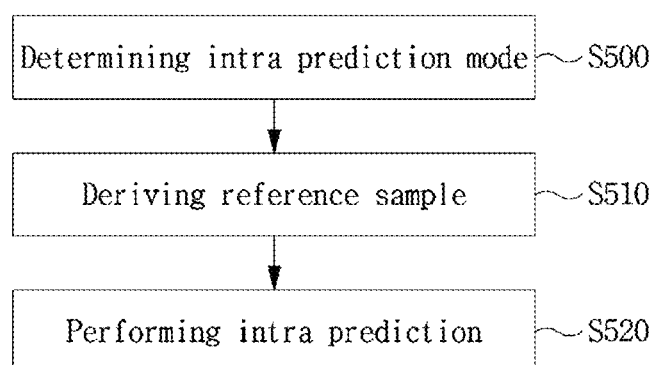
FIG. 5 is a flowchart briefly illustrating an intra prediction method according to an embodiment of the present invention.

FIG. 5 is a flowchart briefly illustrating an intra prediction method according to an embodiment of the present invention.

Referring to FIG. 5, an intra prediction mode of the current block may be determined at step S500.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| | IntraPredModeY[xCb][yCb] | | | | |
|---|---|---|---|---|---|
| Intra_chroma_pred_mode[xCb][yCb] | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 5, a reference sample for intra prediction of the current block may be derived at step S510.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed.

Here, N and M may be the same values or different values, or may be values of 4, 8, 16, or more. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 5, intra prediction may be performed using the intra prediction mode of the current block and the reference sample at step S520.

That is, the prediction sample of the current block may be obtained using the intra prediction mode determined at step S500 and the reference sample derived at step S510. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 6 to 14. However, the correction process is not limited to being applied only to the intra prediction sample, and may be applied to an inter prediction sample or the reconstructed sample.

Figure 6:
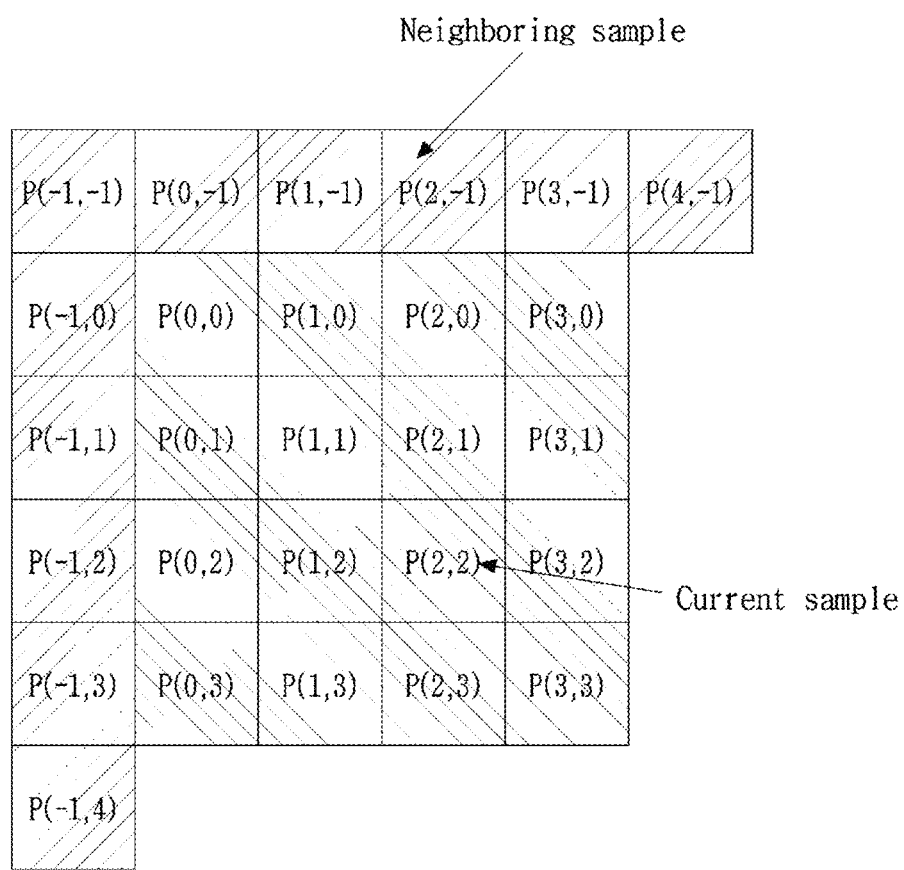
FIG. 6 is a view illustrating a method of correcting a prediction sample of a current block based on differential information of neighboring samples according to an embodiment of the present invention.

FIG. 6 is a view illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in some predetermined regions. Some regions may be one row/column or multiple rows/columns, or may be preset regions for correction in the device for encoding/decoding a video, or may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad \text{[Equation 1]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 2.

$$P'(x,0)=p(x,0)+((p(x,-1)-p(-1,-1))>>1 \text{ for } x=0 \ldots N-1 \quad \text{[Equation 2]}$$

For example, when the intra prediction mode of the current block is the vertical mode, differential samples between the top left neighboring sample p(−1, −1) and neighboring samples p(−1, y) adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad \text{[Equation 3]}$$

$$P'(1,y)=P(1,y)+((p(-1,y)-p(-1,-1))>>2 \text{ for } y=0 \ldots N-1 \quad \text{[Equation 4]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample, as described in the case of the vertical mode. For example, the prediction sample may be corrected as shown in Equation 5 and Equation 6.

$$P'(x,0)=p(x,0)+((p(x,-1)-p(-1,-1))>>1 \text{ for } x=0 \ldots N-1 \quad \text{[Equation 5]}$$

$$P'(x,1)=p(x,1)+((p(x,-1)-p(-1,-1))>>2 \text{ for } x=0 \ldots N-1 \quad \text{[Equation 6]}$$

Figure 7:
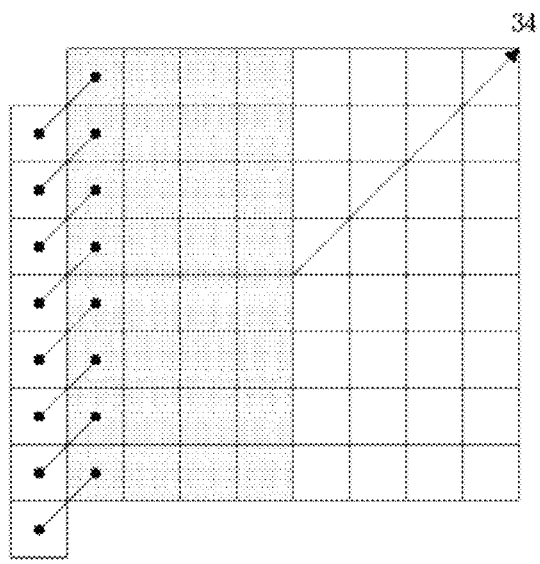
FIGS. 7 and 8 are views illustrating a method of correcting a prediction sample based on a predetermined correction filter according to an embodiment of the present invention.
Figure 8:
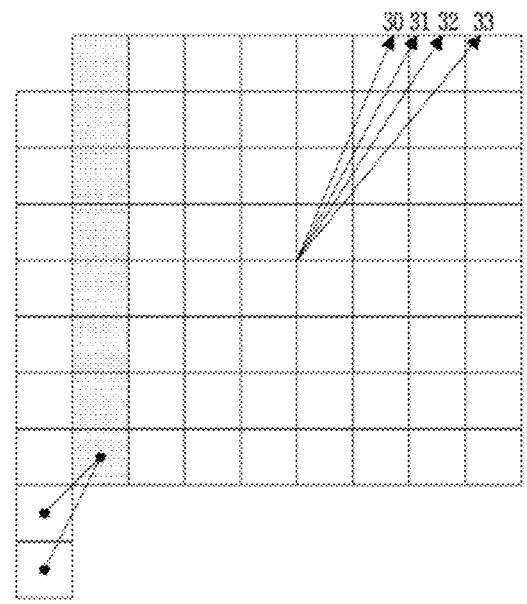

FIGS. 7 and 8 are views illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 7, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a (1/2, 1/2) filter may be used for the left first line closest to the block boundary, a (12/16, 4/16) filter may be used for the second line, a (14/16, 2/16) filter may be used for the third line, and a (15/16, 1/16) filter may be used for the fourth line.

Alternatively, when the directional prediction mode has an index of 3 to 6 or 30 to 33, filtering may be performed on the block boundary as shown in FIG. 8, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a (1/2, 1/2) filter may be used, and when the neighboring block is encoded in the intra mode, a (4/16, 12/16) filter may be used.

The number of lines to be filtered in the current block may vary depending on the size/shape of the current block (e.g., the coding block or the prediction block). For example, when the size of the current block is equal to or less than 32×32, filtering may be performed on only one line at the block boundary; otherwise, filtering may be performed on multiple lines including the one line at the block boundary.

FIGS. 7 and 8 are based on the case where the 35 intra prediction modes in FIG. 4 are used, but may be equally/similarly applied to the case where the extended intra prediction modes are used.

When performing intra prediction on a current block based on a directional intra prediction mode, a generated prediction sample may not reflect the characteristics of an original picture since a range of reference samples being used is limited (e.g., intra prediction is performed only using the neighboring samples adjacent to the current block). For example, when an edge exists in a current block or when a new object appears around a boundary of the current block, a difference between a prediction sample and an original picture may be large depending on a position of a prediction sample in the current block.

In this case, a residual value is relatively large, and thus the number of bits to be encoded/decoded may increase. Particularly, a residual value in a region relatively far from a boundary of the current block may include a large amount of high-frequency components, which may result in degradation of encoding/decoding efficiency.

In order to solve the above problems, a method of generating or updating a prediction sample in units of sub-block may be used. According to this, prediction accuracy in a region relatively far from a block boundary may be enhanced.

For convenience of explanation, in the following embodiments, a prediction sample generated based on a directional intra prediction mode is referred to as a first prediction sample. Also, a prediction sample generated based on a non-directional intra prediction mode or a prediction sample generated by performing inter prediction may also be included in a category of the first prediction sample.

A method of correcting the prediction sample based on the offset will be described in detail with reference to FIG. 9.

Figure 16:
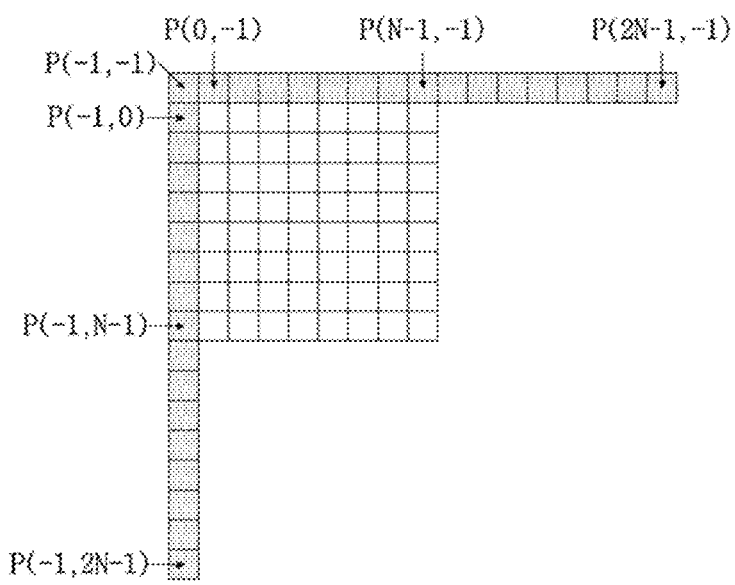
FIG. 16 shows a range of reference samples for intra prediction according to an embodiment to which the present invention is applied.

FIG. 16 is a view illustrating a method of correcting a prediction sample based on offset according to an embodiment of the present invention.

Figure 9:
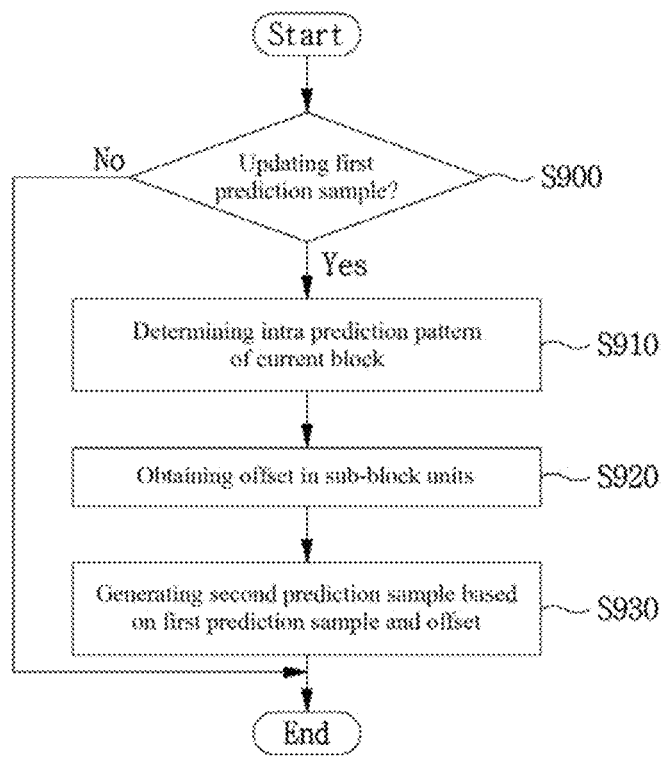
FIG. 9 is a view illustrating a method of correcting a prediction sample based on offset according to an embodiment of the present invention.

Referring to FIG. 9, for a current block, whether to update a first prediction sample using an offset may be determined at step S900. Whether to update the first prediction sample using the offset may be determined by a flag decoded from a bitstream. For example, a syntax 'is_sub_block_refinement_flag' indicating whether to update the first prediction sample using the offset may be signaled through a bitstream. When a value of is_sub_block_refinement_flag is 1, the method of updating the first prediction sample using the offset may be used in the current block. When a value of is_sub_block_refinement_flag is 0, the method of updating the first prediction sample using the offset may not be used in the current block. However, step S900 is intended to selectively perform updating of the first prediction sample, and is not an essential configuration for achieving the purpose of the present invention, so that step S900 may be omitted in some cases.

When it is determined that the method of updating the first prediction sample using the offset is used, an intra prediction pattern of the current block may be determined at step S910. Through the intra prediction pattern, all or some regions of the current block to which the offset is applied, a a partition type of the current block, whether to apply the offset to a sub-block included in the current block, a size/sign of the offset assigned to each sub-block, etc. may be determined.

One of multiple patterns pre-defined in the device for encoding/decoding a video may be selectively used as the intra prediction pattern of the current block, and to this end, an index specifying the intra prediction pattern of the current block may be signaled from a bitstream. As another example, the intra prediction pattern of the current block may be determined based on a partition mode of a prediction unit or a coding unit of the current block, a size/shape of the block, whether the directional intra prediction mode is used, an angle of the directional intra prediction mode, etc.

It is determined by predetermined flag information signaled via a bitstream whether or not an index indicating the intra prediction pattern of the current block is signaled. For example, when the flag information indicates that index indicating the intra prediction pattern of the current block is signaled from a bitstream, the intra prediction pattern of the current block may be determined based on an index decoded from a bitstream. Here, the flag information may be signaled in at least one of a picture level, a slice level, and a block level.

When the flag information indicates that the index indicating the intra prediction pattern of the current block is not signaled from a bitstream, the intra prediction pattern of the current block may be determined based on the partition mode of the prediction unit or the coding unit of the current block, etc. For example, the pattern in which the current block is partitioned into sub-blocks may be the same as the pattern in which the coding block is partitioned into prediction units.

When the intra prediction pattern of the current block is determined, the offset may be obtained in units of sub-block at step S920. The offset may be signaled in units of a slice, a coding unit, or a prediction unit. As another example, the offset may be derived from a neighboring sample of the current block. The offset may include at least one of offset value information and offset sign information. Here, the offset value information may be in a range of integers equal to or greater than zero.

When the offset is determined, a second prediction sample may be obtained for each sub-block at step S930. The second prediction sample may be obtained by applying the offset to the first prediction sample. For example, the second prediction sample may be obtained adding or subtracting the offset to or from the first prediction sample.

FIGS. 10 to 14 are views illustrating examples of an intra prediction pattern of a current block according to an embodiment of the present invention.

Figure 10:
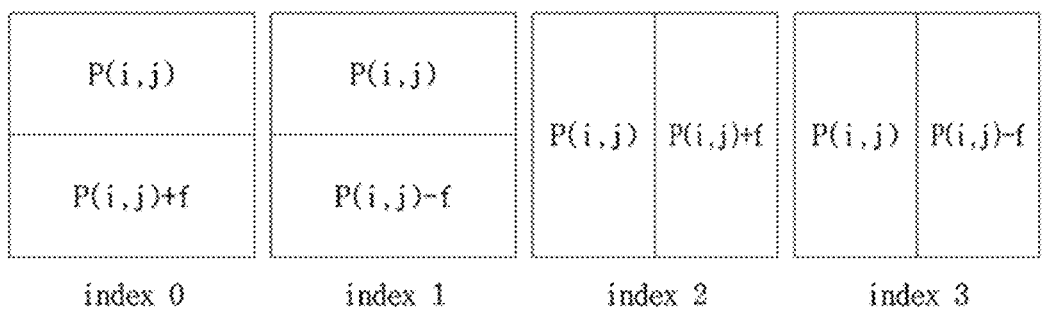

For example, in the example shown in FIG. 10, when the index is '0' or '1', the current block may be partitioned into upper and lower sub-blocks. The offset may be not set to the upper sub-block, and the offset 'f' may be set to the lower sub-block. Therefore, the first prediction sample(P(i,j)) may be used as it is in the upper sub-block, and the second prediction sample(P(i,j)+f or P(i,j)−f) that is generated by adding or subtracting the offset to or from the first prediction sample may be used in the lower sub-block. In the present invention, 'not set' may mean that the offset is not assigned to the block, or the offset having the value of '0' may be assigned to the block.

When the index is '2' or '3', the current block is partitioned into left and right sub-blocks. The offset may not be set for the left sub-block, and the offset 'f' may be set for the right sub-block. Therefore, the first prediction sample(P(i,j)) may be used as it is in the left sub-block, and the second prediction sample(P(i,j)+f or P(i,j)−f) that is generated adding or subtracting the offset to or from the first prediction sample may be used in the right sub-block.

The range of available intra prediction patterns may be limited based on the intra prediction mode of the current block. For example, when the intra prediction mode of the current block is a vertical direction intra prediction mode or a prediction mode in a direction similar to the vertical direction intra prediction mode (e.g., among the 33 directional prediction modes, when the intra prediction mode has an index of 22 to 30), only the intra prediction pattern partitioning the current block in a horizontal direction (e.g., the index 0 or index 1 in FIG. 17) may be applied to the current block.

As another example, when the intra prediction mode of the current block is a horizontal direction intra prediction mode or a prediction mode in a direction similar to the horizontal direction intra prediction mode (e.g., among the 33 directional prediction modes, when the intra prediction mode has an index of 6 to 14), only the intra prediction pattern partitioning the current block in a vertical direction (e.g., the index 2 or index 3 in FIG. 17) may be applied to the current block.

In FIG. 10, the offset is not set for one of the sub-blocks included in the current block, but it is set for the other. Whether to set the offset for the sub-block may be determined based on information signaled for each sub-block.

Whether to set the offset for the sub-block may be determined based on a position of the sub-block, an index for identifying the sub-block in the current block, etc. For example, based on a predetermined boundary of the current block, the offset may not set for the sub-block which adjacent to the predetermined boundary, and the offset may be set for the sub-block which is not adjacent to the predetermined boundary.

When assuming that the predetermined boundary is the top boundary of the current block, under the intra prediction pattern corresponding to the index '0' or '1', the offset may be not set for the sub-block which is adjacent to the top boundary of the current block, and the offset may be set for the sub-block which is not adjacent to the top boundary of the current block.

When assuming that the predetermined boundary is the left boundary of the current block, under the intra prediction pattern corresponding to the index '2' or '3', the offset may not be set for the sub-block which is adjacent to the left boundary of the current block, and the offset may be set for the sub-block which is not adjacent to the left boundary of the current block.

In FIG. 10, it is assumed that the offset is not set for one of the sub-blocks included in the current block but the offset is set for another one. As another example, different values of the offset may be set for the sub-blocks included in the current block.

An example where different offset is set for each sub-block will be described with reference to FIG. 11.

Referring to FIG. 11, when the index is '0' or '1', the offset 'h' may be set for the upper sub-block of the current block, and the offset 'f' may be set for the lower sub-block of the current block. Therefore, the second prediction sample($P(i,j)+h$ or $P(i,j)-h$) may be generated by adding or subtracting the offset 'h' to or from the first prediction sample in the upper sub-block, and the second prediction sample($P(i,j)+f$ or $P(i,j)-f$) may be generated by adding or subtracting the offset 'f' to or from the first prediction sample.

Referring to FIG. 11, when the index is '2' or '3', the offset 'h' may be set for the left sub-block of the current block, and the offset 'f' may be set for the right sub-block of the current block. Therefore, the second prediction sample ($P(i,j)+h$ or $P(i,j)-h$) may be generated by adding or subtracting the offset 'h' to or from the first prediction sample may in the left sub-block, and the second prediction sample ($P(i,j)+f$ or $P(i,j)-f$) may be generated by adding or subtracting the offset 'f' to or from the first prediction sample in the right sub-block.

In FIGS. 10 and 11, the current block is partitioned into two sub-blocks having the same size, but the number of sub-blocks and/or the size of sub-blocks included in the current block is not limited to the examples shown in FIGS. 10 and 11. The number of sub-blocks included in the current block may be three or more, and the sub-blocks may have different sizes.

When multiple intra prediction patterns are available, the available intra prediction patterns may be grouped into multiple categories. In this case, the intra prediction pattern of the current block may be selected based on a first index for identifying a category and a second index identifying an intra prediction pattern in the category.

An example where the intra prediction pattern of the current block is determined based on the first index and the second index will be described with reference to FIG. 12.

Figure 12:
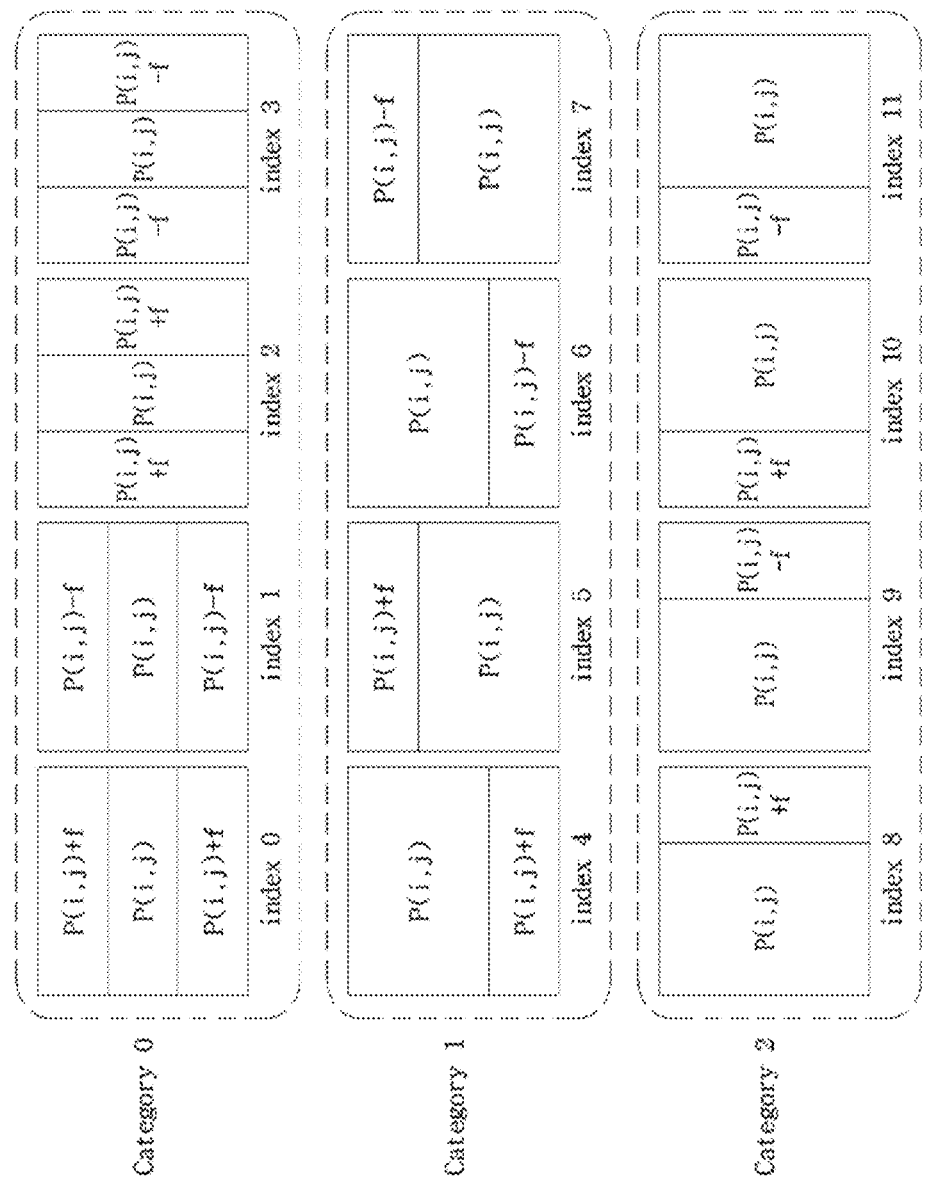
Figure 13:
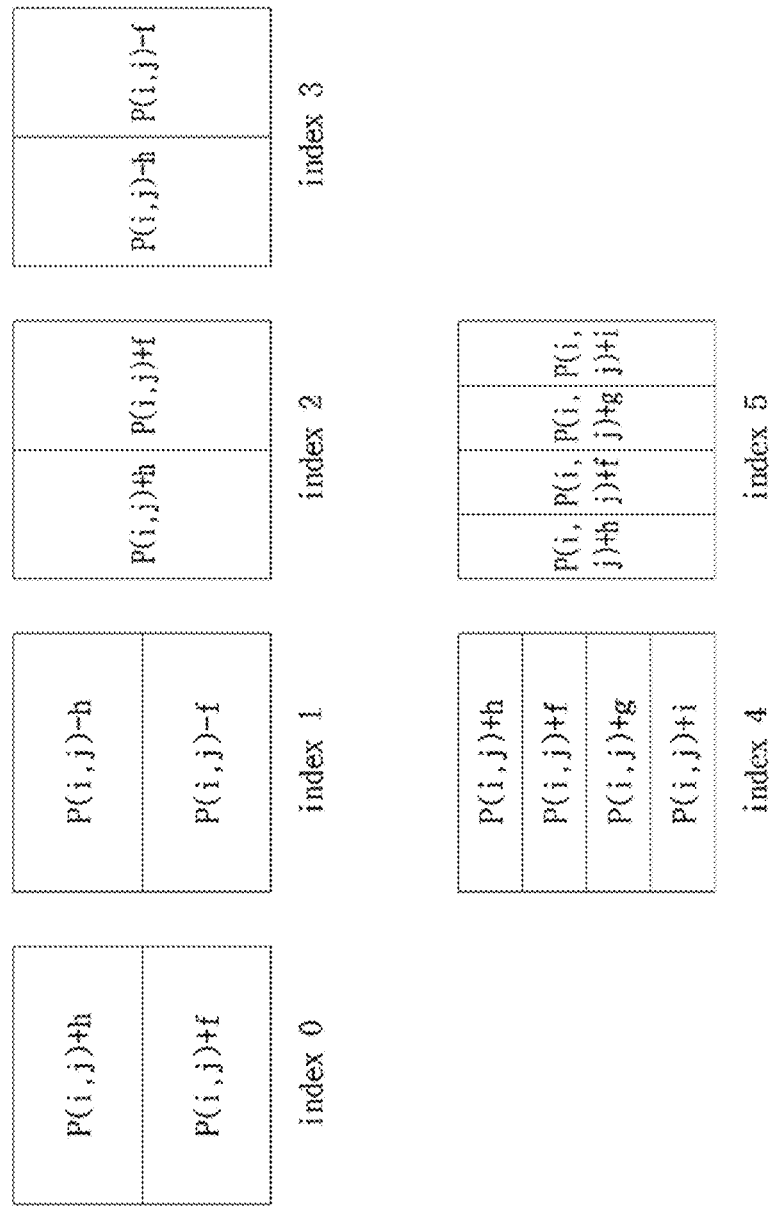

In the example shown in FIG. 12, 12 intra prediction patterns may be classified into three categories each including four intra prediction patterns. For example, intra prediction patterns corresponding to indexes 0 to 3 may be classified as a category 0, intra prediction patterns corresponding to indexes 4 to 7 may be classified as a category 1, and intra prediction patterns corresponding to indexes 8 to 11 may be classified as a category 2.

The device for decoding a video may decode the first index from a bitstream in order to specify the category including at least one intra prediction pattern. In the example shown in FIG. 12, the first index may specify one of the categories 0, 1, and 2.

When the category is specified based on the first index, the intra prediction pattern of the current block may be determined based on the second index decoded from a bitstream. When the category 1 is specified by the first index, the second index may specify one of the four intra prediction patterns (i.e., the index 4 to index 7) of the category 1.

In FIG. 12, it shows that categories include the same numbers of intra prediction patterns. But there is no need to the categories include the same numbers of intra prediction patterns.

The number of available intra prediction patterns or of the number of categories may be determined in units of a sequence or a slice. Also, at least one of the number of available intra prediction patterns and the number of categories may be signaled through a sequence header or a slice header.

As another example, the number of available intra prediction patterns and/or the number of categories may be determined based on a size of a prediction unit or a coding unit of the current block. For example, when the size of the current block (e.g., the coding unit of the current block) is equal to or greater than 64×64, the intra prediction pattern of the current block may be selected from five intra prediction patterns shown in FIG. 13. In contrast, when the size of the current block (e.g., the coding unit of the current block) is less than 64×64, the intra prediction pattern of the current block may be selected from intra prediction patterns shown in FIG. 10, 11, or 12.

Figure 14:
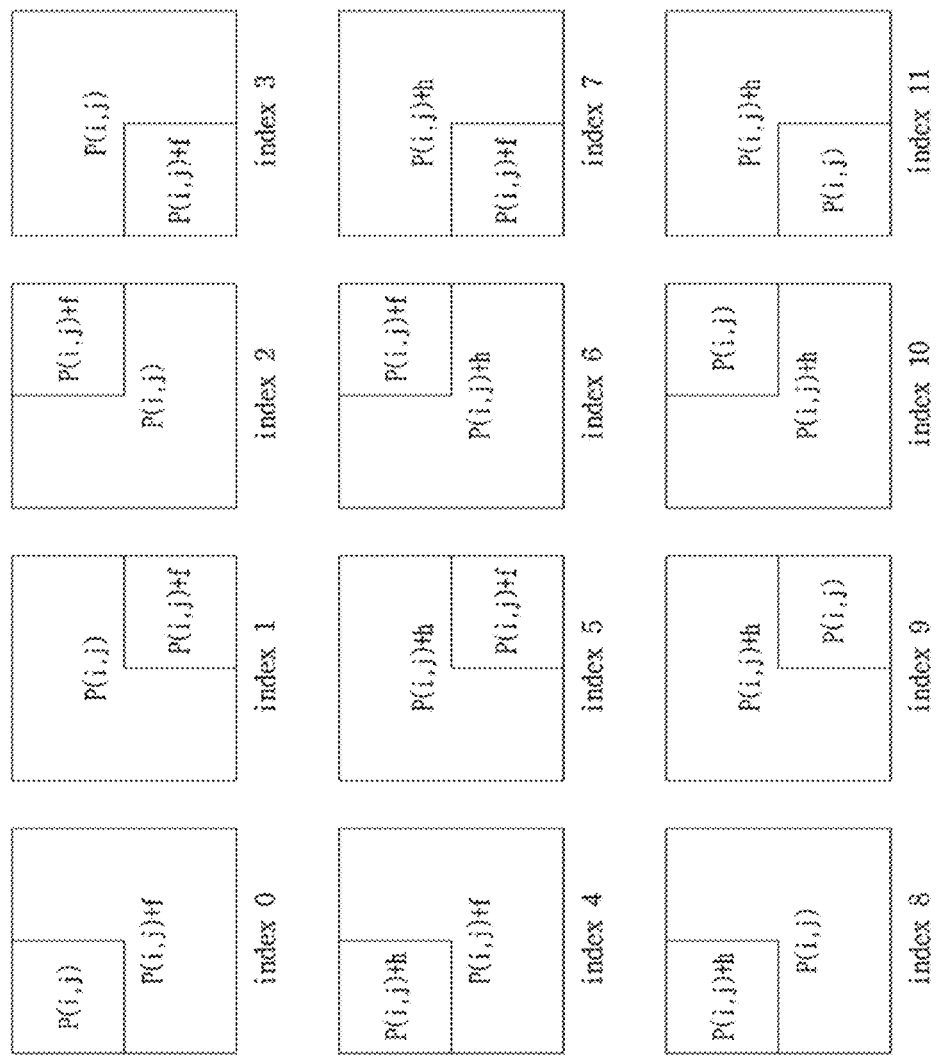

In FIGS. 10 to 13, it is depicted that the sub-blocks included in each intra prediction pattern have a rectangular shape. As another example, the intra prediction pattern where at least one of the sizes and shapes of the sub-blocks are different from each other may be used. For example, FIG. 14 is a view illustrating an example of an intra prediction pattern with different sizes and shapes of sub-blocks.

The offset for each sub-block (e.g., the offset h, f, g, or i of each sub-block shown in FIGS. 10 to 14) may be decoded from a bitstream, or may be derived from the neighboring sample adjacent to the current block.

As another example, the offset of the sub-block may be determined considering the distance from a sample at a particular position in the current block. For example, the offset may be determined in proportion to a value representing the distance between a sample at a predetermined position in the current block and a sample at a predetermined position in the sub-block.

As another example, the offset of the sub-block may be determined adding or subtracting a value determined based on the distance between a sample at a predetermined position in the current block and a sample at a predetermined position in the sub-block to or from a pre-set value.

As another example, the offset may be determined based on a ratio of a value representing the size of the current block and a value representing the distance between a sample at a predetermined position in the current block and a sample at a predetermined position in the sub-block.

Here, the sample at the predetermined position in the current block may include a sample adjacent to the left boundary of the current block, a sample positioned at the top boundary of the current block, a sample adjacent to the top left corner of the current block, etc.

Figure 15:
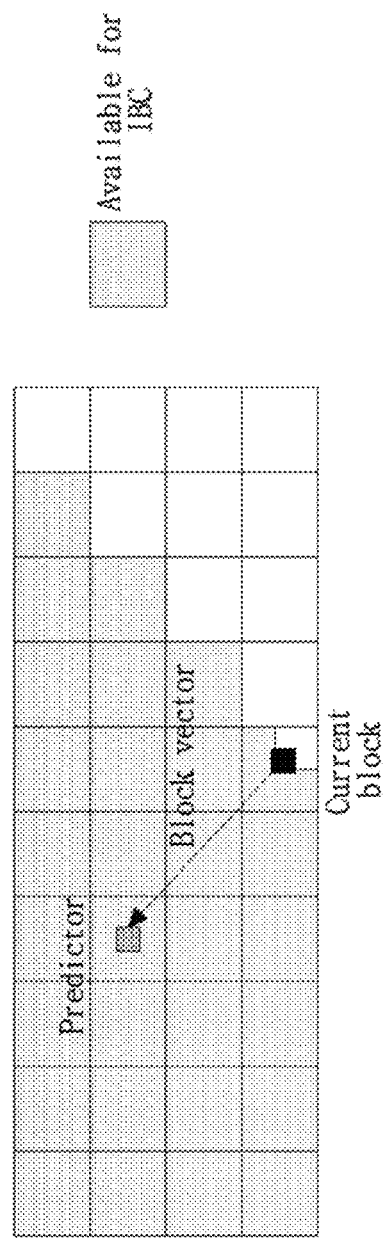
FIG. 15 is a view illustrating a method of performing prediction using an intra block copy technique according to an embodiment of the present invention.

FIG. 15 is a view illustrating a method of performing prediction using an intra block copy scheme according to an embodiment of the present invention.

Intra block copy (IBC) is a method where a current block is predicted/reconstructed using a block (hereinafter, referred to as 'a reference block') already reconstructed in the same picture as the current block. If a picture contains a large number of letters, such as Korean alphabet, an alphabet, etc. and a letter which is contained in the current block when the current block is reconstructed are contained in an already decoded block, intra block copy can enhance an encoding/decoding performance.

An intra block copy method may be classified as an intra prediction method or an inter prediction method. When the intra block copy method is classified as the intra prediction method, an intra prediction mode for the intra block copy method may be defined. When the intra block copy method is classified as the inter prediction method, a bitstream may include a flag indicating whether to apply the intra block copy method to the current block.

Alternatively, whether the current block uses intra block copy may be confirmed through a reference picture index of the current block. That is, when the reference picture index of the current block indicates the current picture, inter prediction may be performed on the current block using intra block copy. To this end, a pre-reconstructed current picture may be added to a reference picture list for the current block. The current picture may exist at a fixed position in the reference picture list (e.g., a position with the reference picture index of 0 or the last position). Alternatively, the current picture may have a variable position in the reference picture list, and to this end, a reference picture index indicating a position of the current picture may be signaled, separately.

In order to specify the reference block of the current block, a position difference between the current block and the reference block may be defined as a motion vector (hereinafter, referred to as a block vector).

The block vector may be derived by a sum of a prediction block vector and a differential block vector. The device for encoding a video may generate a prediction block vector through predictive coding, and may encode the differential block vector indicating the difference between the block vector and the prediction block vector. In this case, the device for decoding a video may derive the block vector of the current block by using the prediction block vector derived using pre-decoded information and the differential block vector decoded from a bitstream.

Here, the prediction block vector may be derived based on the block vector of a neighboring block adjacent to the current block, the block vector in an LCU of the current block, the block vector in an LCU row/column of the current block, etc.

The device for encoding a video may encode the block vector without performing predictive coding of the block vector. In this case, the device for decoding a video may obtain the block vector by decoding block vector information signaled through a bitstream. The correction process may be performed on the prediction/reconstructed sample generated through the intra block copy method. In this case, the correction method described with reference to FIGS. 6 to 14 may be equally/similarly applied, and thus detailed description thereof will be omitted.

FIG. 16 shows a range of reference samples for intra prediction according to an embodiment to which the present invention is applied.

Referring to FIG. 16, intra prediction may performed by using reference samples P (−1, −1), P (−1, y) (0<=y<=2N−1) and P (x, −1) (0<=x<=2N−1) located at a boundary of a current block. At this time, filtering on reference samples is selectively performed based on at least one of an intra prediction mode (e.g., index, directionality, angle, etc. of the intra prediction mode) of the current block or a size of a transform block related to the current block.

At least one of a plurality of intra filter candidates may be selected to perform filtering on reference samples. Here, the plurality of intra-filter candidates may differ from each other in at least one of a filter strength, a filter coefficient or a tap number (e.g., a number of filter coefficients, a filter length). A plurality of intra-filter candidates may be defined in at least one of a sequence, a picture, a slice, or a block level. That is, a sequence, a picture, a slice, or a block in which the current block is included may use the same plurality of intra-filter candidates.

Hereinafter, for convenience of explanation, it is assumed that a plurality of intra-filter candidates includes a first intra-filter and a second intra-filter. It is also assumed that the first intra-filter is a (1,2,1) 3-tap filter and the second intra-filter is a (2,3,6,3,2) 5-tap filter.

When reference samples are filtered by applying a first intra-filter, the filtered reference samples may be derived as shown in Equation 7.

$$P(-1,-1)=(P(-1,0)+2P(-1,-1)+P(0,-1)+2)>>2$$

$$P(-1,y)=(P(-1,y+1)+2P(-1,y)+P(-1,y-1)+2)>>2$$

$$P(x,-1)=(P(x+1,-1)+2P(x,-1)+P(x-1,-1)+2)>>2 \quad \text{[Equation 7]}$$

When reference samples are filtered by applying the second intra-filter, the filtered reference samples may be derived as shown in the following equation 8.

$$P(-1,-1)=(2P(-2,0)+3P(-1,0)+6P(-1,-1)+3P(0,-1)+2P(0,-2)+8)>>4$$

$$P(-1,y)=(2P(-1,y+2)+3P(-1,y+1)+6P(-1,y)+3P(-1,y-1)+2P(-1,y-2)+8)>>4$$

$$P(x,-1)=(2P(x+2,-1)+3P(x+1,-1)+6P(x,-1)+3P(x-1,-1)+2P(x-2,-1)+8)>>4 \quad \text{[Equation 8]}$$

Figure 17:
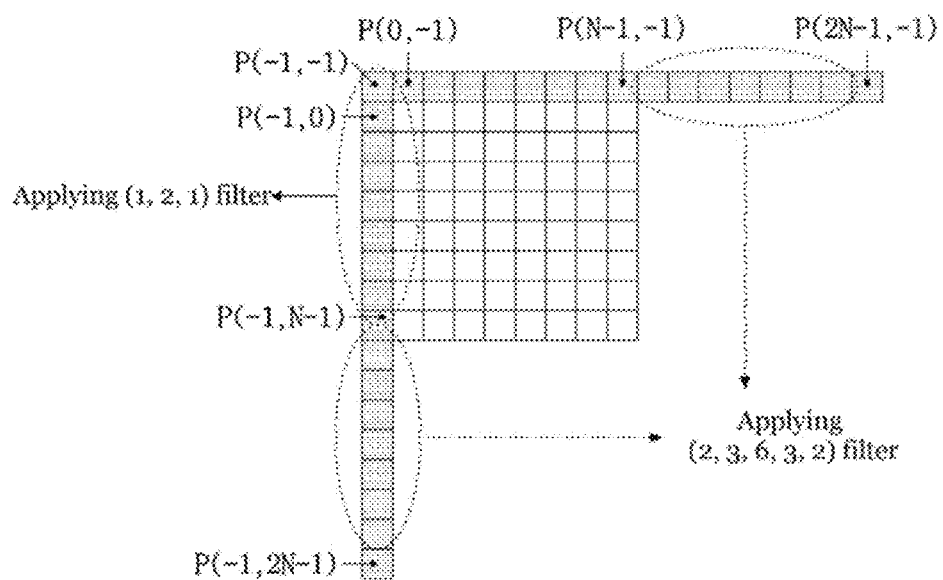
FIGS. 17 to 19 illustrate an example of filtering on reference samples.

Based on a position of a reference sample, one of a plurality of intra-filter candidates may be determined and used to perform filtering on the reference sample by using the determined one. For example, a first intra-filter may be applied to a reference sample at a boundary of a current block, and a second intra-filter may be applied to other reference samples. Specifically, as shown in FIG. 17, filtering on reference samples P (−1, −1), P (−1,0), P (−1,1), . . . , P (−1, N−1) and P (0, −1), P (1, −1), . . . is performed by applying a first intra-filter as shown in Equation 7, and filtering on the other reference samples is performed by applying a second reference filter as shown in Equation 8.

It is possible to select one of a plurality of intra-filter candidates based on a transform type used for a current block, and perform filtering on reference samples using the selected one. Here, the transform type may mean (1) a transform scheme such as DCT, DST or KLT, (2) a transform mode indicator such as a 2D transform, 1D transform or non-transform or (3) the number of transforms such as a first transform and a second transform. Hereinafter, for convenience of description, it is assumed that the transform type means the transform scheme such as DCT, DST and KLT.

For example, if a current block is encoded using a DCT, filtering may be performed using a first intra-filter, and if a current block is encoded using a DST, filtering may be performed using a second intra-filter. Or, if a current block is encoded using DCT or DST, filtering may be performed using a first intra-filter, and if the current block is encoded using a KLT, filtering may be performed using a second intra-filter.

Filtering may be performed using a filter selected based on a transform type of a current block and a position of a reference sample. For example, if a current block is encoded using the a DCT, filtering on reference samples P (−1, −1), P (−1,0), P (−1,1), . . . , P (−1, N−1) and P (0, −1), P (1, −1), . . . , P (N−1, −1) may be performed by using a first intra-filter, and filtering on other reference samples may be performed by using a second intra-filter. If a current block is encoded using a DST, filtering on reference samples P (−1, −1), P (−1,0), P (−1,1), . . . , P (−1, N−1) and P (0, −1), P (1, −1), . . . , P (N−1, −1) may be performed by using a second intra-filter, and filtering on other reference samples may be performed by using a first intra-filter.

One of a plurality of intra-filter candidates may be selected based on whether a transform type of a neighboring block including a reference sample is the same as a transform type of a current block, and the filtering may be performed using the selected intra-filter candidate. For example, when a current block and a neighboring block use the same transform type, filtering is performed using a first intra-filter, and when transform types of a current block and of a neighboring block are different from each other, the second intra-filter may be used to perform filtering.

Figure 18:
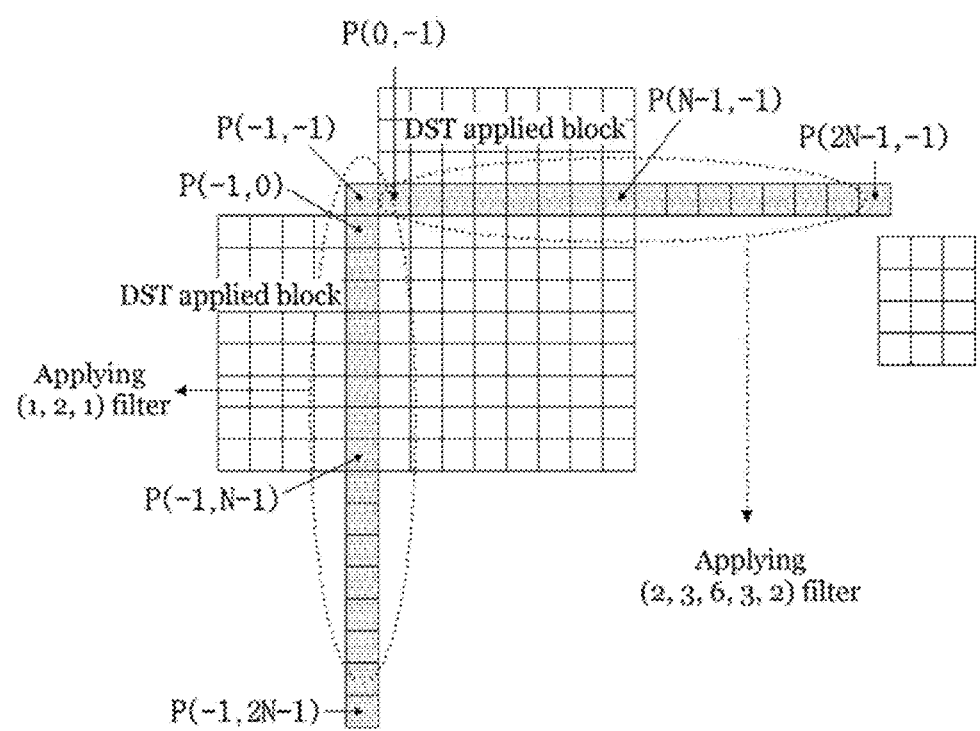

It is possible to select any one of a plurality of intra filter candidates based on a transform type of a neighboring block and perform filtering on a reference sample using the selected one. That is, a specific filter may be selected in consideration of a transform type of a block in which a reference sample is included. For example, as shown in FIG. 18, if a block adjacent to left/lower left of a current block is a block encoded using a DCT, and a block adjacent to top/top right of a current block is a block encoded using a DST, filtering on reference samples adjacent to left/lower left of a current block is performed by applying a first intra filter and filtering on reference samples adjacent to top/top right of a current block is performed by applying a second intra filter.

In units of a predetermined region, a filter usable in the corresponding region may be defined. Herein, the unit of the predetermined region may be any one of a sequence, a picture, a slice, a block group (e.g., a row of coding tree units) or a block (e.g., a coding tree unit) Or, another region may be defined that shares one or more filters. A reference sample may be filtered by using a filter mapped to a region in which a current block is included.

Figures 19, 20:
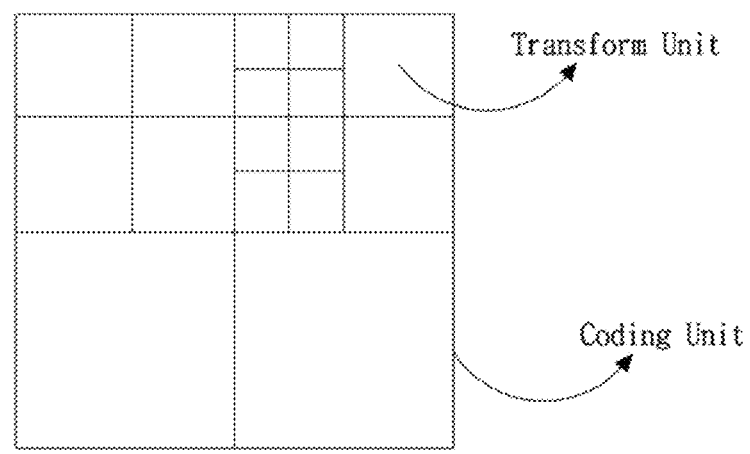
FIG. 20 is a diagram showing an example in which a coding unit is divided into blocks having a square shape.

For example, as shown in FIG. 19, it is possible to perform filtering on reference samples using different filters in CTU units. In this case, information indicating whether the same filter is used in a sequence or a picture, a type of filter used for each CTU, an index specifying a filter used in the corresponding CTU among an available intra filter candidates may be signaled via a sequence parameter set (SPS) or a picture parameter set (PPS).

A coding unit may be divided into at least one or more transform units. At this time, a transform unit may have a square shape or a non-square shape, depending on a partition mode for the transform unit.

A coding unit may be divided into two or more transform units by at least one of a horizontal line dividing the coding unit into up and down or a vertical line dividing the coding unit into left and right. As an example, a quadtree division in which a coding unit is divided into four transform units using a horizontal line dividing the coding unit into up and down and a vertical line dividing the coding unit into left and right may be used. Or, a binary tree division in which a coding unit is divided into two transform units using either a horizontal line or a vertical line may be used. In addition to the example described above, a division scheme that divides a coding unit into a plurality of transform units using a plurality of vertical lines or a plurality of horizontal lines may also be used.

It may be specified by a syntax element signaled from a bitstream whether a coding unit is divided in a quadtree type. This may be a flag of 1 bit, but is not limited thereto.

Furthermore, it may be specified by a syntax element signaled from a bitstream whether a coding unit is divided in a binary tree type. This may be a flag of 1 bit, but is not limited thereto. When it is indicated that a coding unit is divided in a binary tree type, information indicating a dividing direction of a coding unit may be additionally signaled. At this time, the dividing direction may indicate whether a coding unit is divided by a vertical line or by a horizontal line.

A transform unit generated by dividing a coding unit may be divided again into at least one transform unit. For example, a transform unit generated by dividing a coding unit may be divided in a quadtree or a binary tree type.

FIG. 20 is a diagram showing an example in which a coding unit is divided into blocks having a square shape.

When it is determined that a coding unit is divided in a quad tree type, the coding unit may be divided into four transform units. When the coding unit is divided into four transform units, it is possible to determine, for each transform unit, whether to further divide the transform unit. As an example, for four transform units, it may be determined whether to split each transform unit in a quadtree or binary tree type.

For example, in the example shown in FIG. 20, it is illustrated that a first and second transform units among four transform units generated by dividing a coding unit in quad-tree type are again divided in a quadtree type. In addition, it is illustrated that a first and third transform units among four transform units generated by dividing the second transform unit are again divided in a quadtree type.

As such, a transform unit may be recursively partitioned. Accordingly, a coding unit may include transform units of different sizes, as shown in FIG. 20.

Figure 21A:
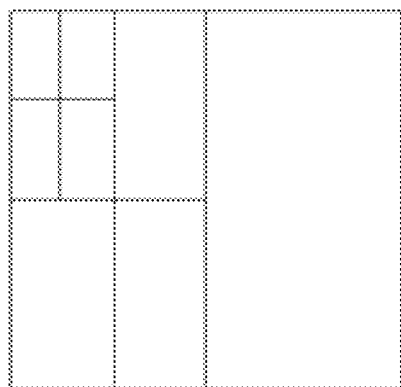
FIG. 21A and FIG. 21B are a diagram showing an example in which a coding unit is divided into blocks having a non-square shape.
Figure 21B:
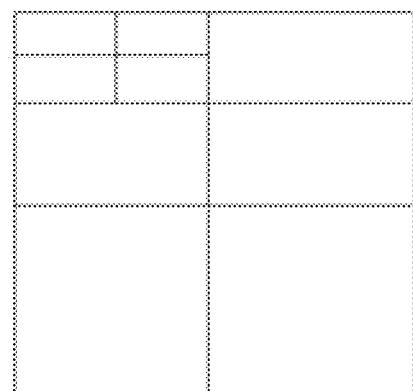

FIG. 21A and FIG. 21B are a diagram showing an example in which a coding unit is divided into blocks having a non-square shape.

Like a prediction unit, a coding unit may be divided to have a non-square shape. In one example, a coding unit may be divided as N×2N or 2N×N shape. When a coding unit is divided to have a non-square shape, it is possible to determine for each transform unit, whether to further divide the transform unit. As an example, for two transform units, it may be determined whether to further split each transform unit in a quadtree type or binary tree type.

For example, in the example shown in FIG. 21A, it is illustrated that a first block among N×2N blocks generated by dividing a coding unit to have a non-square shape is divided in a quadtree type. In addition, it is illustrated that a first transform unit among four transform units generated by dividing the first transform unit in a quadtree type is divided in a quadtree type again.

In addition, in the example shown in FIG. 21B, it is illustrated that a first and second blocks among 2N×2N blocks generated by dividing a coding unit in a quadtree type are divided in a 2N×N binary tree type. In addition, it is illustrated that a first transform unit among two transform units generated by dividing the first transform unit in a 2N×N binary tree type is divided in a quad tree type.

A partition mode for a transform unit or whether the transform unit is further divided may determine according to at least one of a size of the transform unit, a shape of the transform unit, a prediction mode or a partition mode for a prediction unit.

For example, a partition mode for a transform unit may be restricted by a shape of the transform unit. As a specific example, when a transform unit has a shape that a height is longer than a width, a partition mode for the transform unit may be restricted to that a lower node transform unit generated as a result of division of the transform unit has a shape that a width is longer than a height.

For example, when an upper node transform unit has a 2N×N shape, a lower node transform unit included in the upper node transform unit may be restricted to have a 2N×N shape. Accordingly, a partition mode for the upper node transform unit may be restricted to a quadtree type.

Alternatively, when a height of a transform unit is larger than a width, a partition mode for the transform unit may be restricted to that a lower node transform unit generated as a result of division of the transform unit has a shape that a height is longer than a width.

For example, when an upper node transform unit has a N×2N shape, a lower node transform unit included in the upper node transform unit may be restricted to have a N×2N shape. Accordingly, a partition mode for the upper node transform unit may be restricted to a quadtree type.

As another example, a partition mode for a transform unit may be determined based on a partition mode for a prediction unit. As a specific example, when a prediction unit is divided as a square shape (e.g., 2N×2N), a transform unit can be divided as a square shape only. On the other hand, when a prediction unit is divided as a non-square shape (e.g., 2N×N or N×2N), a transform unit can be divided as a non-square shape only.

It may be set that, when a transform unit has a non-square shape, the transform unit can be divided in a quad tree type only and cannot be divided in a binary tree type. For example, when a transform unit has a shape of N×2N or 2N×N, the transform unit may be divided in a quad tree type including four N×2N blocks or four 2N×N blocks.

As another example, it may be set that a transform unit cannot be further divided when the transform unit has a non-square shape.

A transform unit is a base unit of a transform, and an inverse transform may be performed for each transform unit.

Hereinafter, an example in which an inverse transform is performed on a current block will be described in detail with reference to FIG. 22. Here, the current block may represent a transform unit (a transform block) which is a unit in which an inverse transform is performed.

Figure 22:
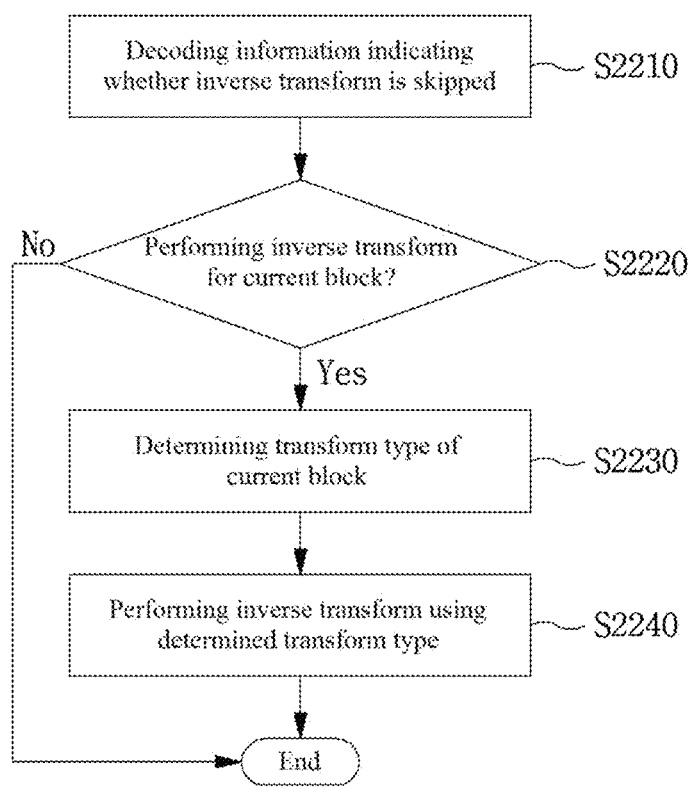
FIG. 22 is a flowchart illustrating a process of performing an inverse transform for a current block.

FIG. 22 is a flowchart illustrating a process of performing an inverse transform for a current block.

First, a decoder may decode information indicating whether an inverse transform is skipped for a current block from a bitstream (S2210).

The information indicates whether at least one of an inverse transform for a vertical direction or an inverse transform for a horizontal direction is skipped for a current block. Here, the information may be a 1-bit flag (e.g., 'transform_skip_flag'), but is not limited thereto.

If the information indicates that an inverse transform is skipped for a current block, at least one of a vertical direction inverse transform or a horizontal direction inverse transform for the current block may be skipped. At this time, it is adaptively determined based on a size, a shape or a prediction mode of the current block whether one of the vertical direction inverse transform and the horizontal direction inverse transform is skipped for the current block.

For example, if a current block is a non-square shape having a width greater than a height (e.g., when the current block has a 2N×N shape), a vertical direction inverse transform may be skipped, but a horizontal direction inverse transform may not be skipped. If a current block is a non-square shape having a height greater than a width (e.g., when the current block has a N×2N shape), a horizontal direction inverse transform may be skipped, but a vertical direction inverse transform may not be skipped. On the other hand, when a current block is a square shape, both a vertical direction inverse transform and a horizontal direction inverse transform may be skipped.

As another example, if the information indicates that an inverse transform for a current block is skipped, the decoder may further decode information indicating a skipped direction of an inverse transform from a bitstream. Here, the information indicating the skipped direction of the inverse transform may indicate a horizontal direction, a vertical direction, or both directions.

The decoder may skip at least one of a horizontal direction inverse transform and a vertical direction inverse transform for a current block based on the information indicating the skipped direction of the inverse transform.

The information indicating whether an inverse transform for a current block is skipped may include information indicating whether an inverse transform of a horizontal direction is skipped for the current block and information indicating whether an inverse transform of a vertical direction is skipped for the current block. Each piece of information may be a 1-bit flag (e.g., 'hor_trasnform_skip_flag' indicating whether a horizontal direction inverse transform is skipped or 'ver_transform_skip_flag' indicating whether a vertical direction inverse transform is skipped), but is not limited thereto.

At this time, the information indicating whether an inverse transform of a horizontal direction and the information indicating whether an inverse transform of a vertical direction may be adaptively signaled according to a size, a type, or a prediction mode of a current block.

For example, when a current block has a non-square shape, the decoder may decode only one of information indicating whether an inverse transform of a horizontal direction is skipped or information indication whether an inverse transform of a vertical direction is skipped from a bitstream. As a specific example, when a current block is a non-square shape having a width larger than a height, information indicating whether an inverse transform of a vertical direction is skipped may be signaled through a bitstream, while information indicating whether an inverse transform of a horizontal direction is skipped may not be signaled through the bitstream. When a current block is a non-square shape having a height greater than a width, information indicating whether an inverse transform of a horizontal direction is skipped may be signaled through a bitstream, while information indicating an inverse transform of a vertical direction is skipped may not be signaled through the bitstream.

On the other hand, when a current block has a square shape, the decoder may decode both information indicating whether an inverse transform of a horizontal direction is skipped and information indicating whether an inverse transform of a vertical direction is skipped from a bitstream.

If it is determined to perform an inverse transform for at least one of a vertical direction or a horizontal direction for a current block (S2220), the decoder may determine a transform type for the current block (S2230). The decoder may perform an inverse transform for the current block based on the transform type for the current block (S2240).

The transform type includes transform schemes such as DCT, DST or KLT. Here, the DCT comprises at least one of DCT-II or DCT-VIII and the DST comprises at least one of DST-I or DST-VII.

A transform type of a current block may be determined based on a prediction mode of the current block and a size of the current block. For example, if a current block is a 4×4 block coded in an intra mode, an inverse transform is performed using DST-VII, and if the current block does not satisfy those conditions, an inverse transform may be performed using DCT-II.

As an example, a DST-VII matrix for a 4×4 block may be expressed as $A_4$ below.

$$A_4 = \begin{bmatrix} 29 & 55 & 74 & 84 \\ 74 & 74 & 0 & -74 \\ 84 & -29 & -74 & 55 \\ 55 & -84 & 74 & -29 \end{bmatrix}$$

An inverse transform using the DST-VII may be performed using an inverse DST-VII matrix $A_4^T$.

A DCT-II matrix for an 8×8 block may be expressed as $T_8$ below.

$$T_8 = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{bmatrix}$$

An inverse transform using the DCT-II may be performed using an inverse DCT-II matrix $T_8^T$.

As another example, the decoder may determine a transform set for a current block and determine a transform type for the current block based on the determined transform set. Here, the transform set may be obtained in units of a transform unit, a coding unit or a coding tree unit. As another example, the transform set may be obtained for a transform unit or a coding unit whose a size or a depth is greater than or equal to a predetermined value.

For convenience of explanation, in the embodiments described below, it is assumed that a transform set is obtained for a transform unit including a plurality of transform units or for a coding unit including a plurality of transform units. And, a unit in which the transform set is obtained will be referred to as a 'base unit'.

First, when a transform set is determined in units of a coding unit or a transform unit, a transform type of a plurality of transform units included in a base unit may be determined based on the determined transform set. At this time, the transform set may include a plurality of transform types.

A transform type of a transform unit included in a base unit may be determined to be at least one of a plurality of transform types included in a transform set. For example, a transform type of a transform unit may be adaptively determined according to a shape of a transform unit, a size of a transform unit, or a prediction mode. As a specific example, when it is assumed that a transform set includes two transform types, a transform type of a transform unit may be determined as the first one of the two transform types when the transform unit to be inversely transformed satisfies a predetermined condition. On the other hand, when a transform unit to be inversely transformed does not satisfy the predetermined condition, a transform type of the transform unit may be determined as the second one of the two transform types.

Table 3 is a chart shows transform set candidates.

TABLE 3

| Transform set index | Transform set candidate 0 | Transform set candidate 1 |
|---|---|---|
| 0 | DST-VII | DCT-II |
| 1 | DST-VII | DST-I |
| 2 | DST-VII | DCT-VIII |

Transform sets may be identified by transform set indexes and a transform set of a current block may be specified by index information indicating a transform set index. The index information relating to the transform set of the current block may be decoded from a bitstream.

In Table 3, 'transform type candidate 0' indicates a transform type used when a transform unit satisfies a predetermined condition, and 'transform type candidate 1' indicates a transform type used when a transform unit does not satisfy a predetermined condition. Here, the predetermined condition may represent whether a transform unit has a square shape, whether a size of a transform unit is less than or equal to a predetermined value, whether a coding unit is encoded in an intra prediction mode, and the like.

For example, the predetermined condition may indicate whether a transform unit is a block equal to or smaller than 4×4 encoded in an intra prediction mode. In this case, a transform type candidate 0 is applied to a 4×4 transform unit coded in an intra prediction mode satisfying the predetermined condition, and a transform type candidate 1 is applied to other transform units that do not satisfy the predetermined condition. For example, when a transform set 0 is selected as a transform set of a current block, if the current block is a block equal to or smaller than 4×4 coded in an intra-prediction mode, DST-VII is determined as a transform type. And if a current block is not a block equal to or smaller than 4×4 coded in an intra prediction mode, DCT-II may be applied.

The predetermined condition may be variably set according to a transform set. For example, when a transform set 0 or a transform set 1 is selected as a transform set for a current block, one of a transform type candidate 0 or a transform type candidate 1 may be determined as a transform type of the current block according to whether the current block is a block equal to or smaller than 4×4 coded in the intra prediction mode. On the other hand, when a transform set 2 is selected as a transform set for a current block, one of a transform type candidate 0 or a transform type candidate 1 may be determined as a transform type of the current block according to whether the current block is a block equal to or smaller than 8×8 coded in the intra prediction mode.

Thus, when a transform set for a base unit is determined as a transform set 0, DST-VII may be applied to a 4×4 transform unit encoded in an intra prediction mode included in the base unit, and DCT-II may be applied to other transform units. On the other hand, when a transform set for a base unit is determined as a transform set 2, DST-VII may be applied to a 4×4 transform unit encoded in an intra prediction mode or an 8×8 transform unit encoded in an intra prediction mode included in the base unit, and DCT-VIII may be applied to other transform units.

The predetermined condition may be adaptively determined according to a size, a shape, or a prediction mode of a base unit. For example, when a size of a base unit (e.g., a coding unit) is smaller than or equal to 32×32, the predetermined condition may indicate whether a transform unit is a block equal to or smaller than 4×4 coded in an intra prediction mode. On the other hand, when a size of a base unit (e.g., a coding unit) is larger than 32×32, the predetermined condition may indicate whether a transform unit is a block equal to or smaller than 8×8 coded in an intra prediction mode.

Thus, when a size of a base unit is smaller than or equal to 32×32, a transform type candidate 0 may be applied to a 4×4 transform unit encoded in an intra prediction mode included in the base unit, and a transform type candidate 1 may be applied to other transform units. On the other hand, when a size of a base unit is larger than 32×32, a transform type candidate 0 may be applied to a 4×4 transform unit encoded in an intra prediction mode or an 8×8 transform unit encoded in an intra prediction mode included in the base unit, and a transform type candidate 1 may be applied to other transform units.

If it is determined to perform both an inverse transform of a horizontal direction and an inverse transform of a vertical direction for a current block, a transform set for the horizontal direction of the current block and a transform set for the vertical direction of the current block may be determined separately. For example, an inverse transform of a horizontal direction of a current block is performed using a transform set 0, and an inverse transform of a vertical direction of the current block is performed using a transform set 1.

Whether to use different transform sets for a horizontal direction and a vertical direction of the current block may be adaptively determined based on a size, a shape or a prediction mode of a current block or a base unit.

Figure 23:
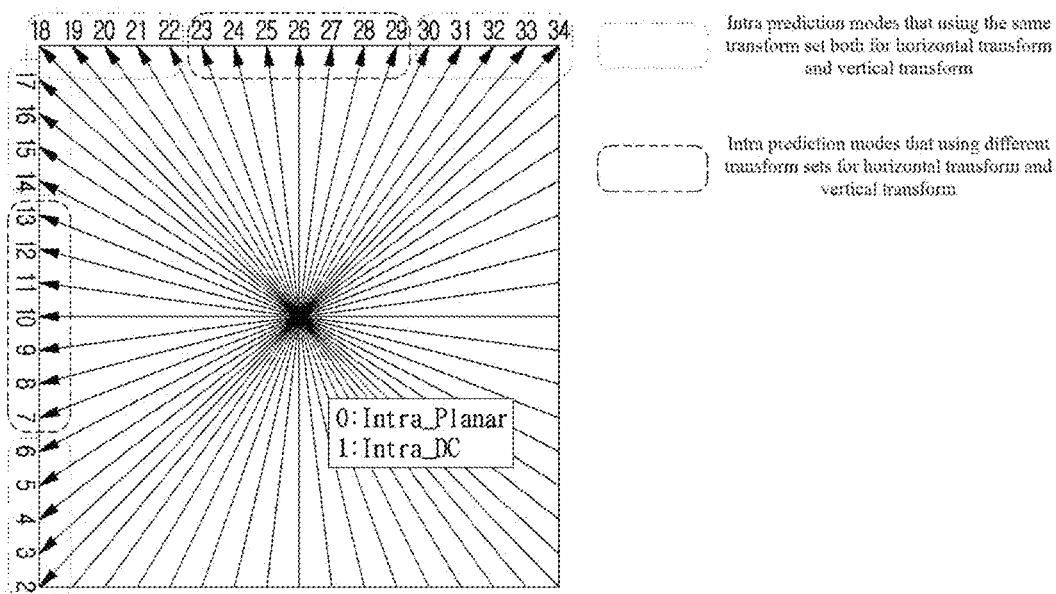
FIG. 23 shows an example in which a transform set of a transform unit is determined based on an intra prediction mode of a prediction unit.

For example, FIG. 23 shows an example in which a transform set of a transform unit is determined based on an intra prediction mode of a prediction unit.

Whether to use different transform sets for a horizontal direction and a vertical direction may be determined according to an intra prediction mode of a prediction unit corresponding to a current block. For example, when an intra prediction mode of a prediction unit is a vertical direction or a horizontal direction, or when an intra prediction mode of a prediction unit is similar to a vertical direction or similar to a horizontal direction, different transform sets may be used for a horizontal direction and a vertical direction of a current block. If an intra prediction mode of a prediction unit is a non-directional mode, or is not the same or similar to a vertical direction or a horizontal direction, the same transform set may be used for a horizontal direction and a vertical direction of a current block.

Here, an intra-prediction mode similar to a vertical direction or a horizontal direction is an intra-prediction mode having a direction similar to an intra-prediction mode with a vertical direction or a horizontal direction. And the intra-prediction mode similar to the vertical direction or the horizontal direction means an intra-prediction mode in which a difference from the intra prediction mode with the vertical direction or the horizontal direction is less than or equal to a threshold value. For example, as in the example shown in FIG. 23, if intra-prediction modes include 33 directional intra-prediction modes, intra prediction modes in which a difference from an intra-prediction mode with a horizontal direction or a vertical direction (10, 26) is equal to or less than ±3 may be determined as the intra-prediction mode similar to a vertical direction or a horizontal direction.

As described above, a transform set of a base unit may be determined based on index information signaled through a bitstream. At this time, for the base unit, a transform set of a horizontal direction and a transform set of a vertical direction may be determined individually. The transform set of the horizontal direction for the base unit may be specified by first index information and the transform set of the vertical direction for the base unit may be specified by second index information. A transform type of a transform unit included in the base unit may be determined based on the transform set determined for the base unit.

As another example, a transform set for a current block may be determined based on at least one of a size of the current block, a shape of the current block, a prediction mode of the current block or a transform set of a unit decoded prior to the current block.

For example, it may be set to that units that have the same intra prediction mode among a plurality of units included in a coding unit or a transform unit use the same transform set.

As a specific example, it is assumed that a first transform unit in a scanning order has an intra prediction mode with a vertical direction, and that a transform set 2 is used for a horizontal direction and a transform set 0 is used for a vertical direction of the first transform unit. In this case, a transform unit which has an intra prediction mode with a vertical direction may have the same transform set as the first transform unit which has the intra prediction mode with the vertical direction. Accordingly, the transform unit which has the intra prediction mode with the vertical direction may be related to the current block. For example, Table 4 illustrates transform set indexes of a horizontal direction and a vertical direction according to an intra-prediction mode of a current block.

TABLE 4

| | Intra Mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Horizontal(H) | 2 | 1 | 0 | 1 | 0 | 1 | 0 | 1 | 0 | 0 | 0 | 0 | 0 | 1 | 0 | 1 | 0 | 1 |
| Vertical (V) | 1 | 1 | 0 | 1 | 0 | 1 | 0 | 1 | 2 | 2 | 2 | 2 | 2 | 1 | 0 | 1 | 0 | 1 |

| | Intra Mode | | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Horizontal(H) | 0 | 1 | 0 | 1 | 0 | 1 | 2 | 2 | 2 | 2 | 2 | 1 | 0 | 1 | 0 | 1 | 0 |
| Vertical (V) | 0 | 1 | 0 | 1 | 0 | 1 | 0 | 0 | 0 | 0 | 0 | 1 | 0 | 1 | 0 | 1 | 0 | use the transform set 2 for a horizontal direction and the transform set 0 for a vertical direction, like the first transform unit which has the intra prediction mode with the vertical direction.

In this case, index information may be signaled only for the first transform unit which has the intra prediction mode with the vertical direction, and index information may not be signaled for the other transform unit which has the intra prediction mode with the vertical direction.

In addition, it may be set that units that have similar intra prediction modes among a plurality of transform units included in a coding unit or a transform unit use the same transform set. At this time, intra prediction modes included in a range where a difference from an intra prediction mode in a predetermined direction is equal to or less than a threshold value may be determined to be similar to each other. For example, when the predetermined direction is a horizontal or a vertical direction, intra prediction modes included in a range of ±3 or less from the horizontal or vertical intra prediction mode may be determined to be similar mutually.

As a specific example, it is assumed that a first transform unit in a scanning order has an intra prediction mode with a vertical direction or close to a vertical direction, and that a transform set 2 is used for a horizontal direction and a transform set 0 is used for a vertical direction of the first transform unit. In this case, a transform unit which has an intra prediction mode with a vertical direction or close to a vertical direction may have the same transform set as another transform unit which has an intra prediction mode with a vertical direction or close to a vertical direction. When it is assumed that an intra prediction mode in which a difference from a vertical direction is equal to or smaller than 3 is similar to a vertical direction, a transform unit which has an intra prediction mode with any one of 23-29 may use a transform set 2 for a horizontal direction and a transform set 0 for a vertical direction, like the first transform unit which has the intra prediction mode with any one of 23-29.

In this case, index information may be signaled only for the first transform unit which has the intra prediction mode with the vertical direction or close to the vertical direction, and index information may not be signaled for the other transform unit which has the intra prediction mode with the vertical direction or close to the vertical direction.

A transform set for a current block may be determined according to an intra prediction mode of a prediction unit related to the current block.

As shown in Table 4, a transform set of a current block may be determined according to an intra prediction mode of a prediction unit related to the current block.

If a base unit is encoded with inter prediction, a process of determining a transform set for a current block may be omitted. That is, if the base unit is coded with inter prediction, the current block may be inversely transformed without using the transform set. In this case, a transform type of the current block may be determined as DCT, DST, or KLT depending on a size and a shape of the current block.

When a base unit is coded with inter prediction, a transform set for a current block is determined, and only a part of a plurality of transform type candidates included in the transform set may be used for an inverse transform of the current block. For example, when it is assumed that a transform set of a current block includes a transform type candidate 0 and a transform type candidate 1 as illustrated in Table 3, a transform type of the current block may be determined to be the transform type candidate 0 or the transform type candidate 1, regardless of whether the current block satisfies a predetermined condition.

In Table 3 above, it is illustrated that a transform set includes two transform type candidates. The number of transform type candidates included in a transform set is not limited to two. The number of transform type candidates included in a transform set may be one, three, four, or more.

The number of maximum transform type candidates that a transform set may include may be determined based on information signaled from a bitstream. For example, information about the number of maximum candidates in a transform set is signaled via a slice or sequence header, and the number of maximum transform type candidates available in the slice or sequence may be determined by the information.

Meanwhile, the number of candidates included in a transform set or a transform type candidate included in a transform set may be adjusted according to information indicating whether an inverse transform skip is allowed in a picture. Here, the information indicating whether an inverse transform skip is allowed in a picture may be a 1-bit flag (e.g., 'transform_skip_enabled_flag'), but is not limited thereto.

For example, if 'transform_skip_enabled_flag' indicates that an inverse transform skip is allowed in a picture, a transform set may further include 'transform skip' as a candidate, as in the example of Table 5. If 'transform_skip_enabled_flag' indicates that an inverse transform skip is not allowed in a picture, a transform set may not include 'transform skip' as a candidate, as in the example of Table 5.

TABLE 5

| Transform set Index | Transform candidates 0 | Transform candidates 1 | Transform candidates 2 |
|---|---|---|---|
| 0 | DST-VII | DCT-II | Transform skip |
| 1 | DST-VII | DST-I | Transform skip |
| 2 | DST-VII | DCT-VIII | Transform skip |

Since a transform set includes a plurality of transform type candidates, an inverse transform scheme using a transform type may be referred to as AMT (Adaptive Multiple Transform). Meanwhile, whether AMT is used (i.e., whether to determine a transform type of a current block using a transform set) may be selectively determined according to a size or a depth of the current block or a base unit. For example, a current block may determine a transform type using a transform set only when a size of a coding unit including the current block is less than or equal to a predetermined size. Here, a maximum size of the coding unit in which AMT is allowed may be signaled through a slice header or a sequence header.

Next, a process of obtaining a quantization parameter for a current block will be described.

In the encoding process, a quantization parameter determines a quality of an image after a transform process. A quantized transform coefficient may be obtained by dividing a transform coefficient obtained through a transform process by a value specified by the quantization parameter.

In the decoding step, a dequantized transform coefficient is obtained by an inverse quantization which is performed by multiplying a quantized transform coefficient by a value specified by the quantization parameter.

Different quantization parameters may be applied for each block or each area within a picture. Here, blocks or areas to which the same quantization parameter is applied may be referred to as a 'quantization group' (QG).

In order to obtain a quantization parameter of a quantization group, a quantization parameter of a picture or a slice and a quantization parameter difference value (DeltaQP, dQp) may be signaled. The quantization parameter difference value indicates a difference value between the quantization parameter of the quantization group and a quantization parameter prediction value. At this time, when the quantization group is a first group in a picture or in a slice, a quantization parameter of the picture or the slice may be set as the quantization parameter prediction value of the quantization group.

A size of a quantization group may be determined according to a syntax element indicating a size of the quantization group and a size of a coding tree unit. For example, Table 6 shows a size of a quantization group according to 'diff_cu_qp_delta_depth' representing the size of the quantization group and a size of a coding tree unit.

TABLE 6

| diff_cu_qp_delta_depth | QG size for 64 × 64 CTU | QG size for 32 × 32 CTU | QG size for 16 × 16 CTU |
|---|---|---|---|
| 0 | 64 × 64 | 32 × 32 | 16 × 16 |
| 1 | 32 × 32 | 16 × 16 | 8 × 8 |
| 2 | 16 × 16 | 8 × 8 | — |
| 3 | 8 × 8 | — | — |

Here, 'diff_cu_qp_delta_depth' represents a difference value between a size of a coding tree unit and a size of a quantization group.

A quantization parameter difference value may be signaled for a coding unit or a transform unit having a non-zero transform coefficient. When a coding tree unit is divided into a plurality of coding units, a quantization parameter difference value may be signaled for a coding unit or a transform unit having a non-zero transform coefficient.

In the encoding step, the encoder may derive a quantization parameter difference value based on a value related to a current block (e.g., an average value) to be encoded. Hereinafter, a method of deriving a quantization parameter difference value based on a value related to a current block will be described in detail with reference to the figures. For convenience of explanation, in the embodiment described later, a value related to a current block is referred to as an average value of the current block.

Figure 24:
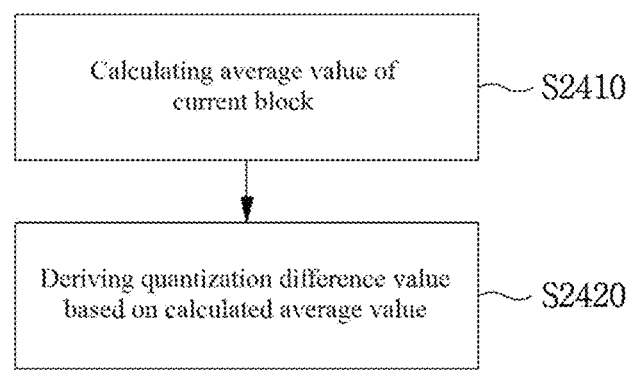
FIG. 24 is a flowchart illustrating a method of deriving a quantization parameter difference value according to an embodiment of the present invention.

FIG. 24 is a flowchart illustrating a method of deriving a quantization parameter difference value according to an embodiment of the present invention. In the embodiment to be described later, a current block may mean a quantization group, a coding tree unit, a coding unit or a transform unit which corresponding to units in which the quantization parameter is obtained.

In order to derive a quantization parameter difference value, an average value of a current block may be calculated (S2410). The average value of the current block may be obtained based on a prediction sample and a transform coefficient.

Specifically, the average value of the current block may be obtained by adding an average value of prediction samples in the current block and a value obtained by scaling a DC component (i.e., a DC coefficient) of a transform coefficient. Here, the DC component may mean a coefficient corresponding to a DC component among transform coefficients generated by transforming residual samples. Equation 9 shows a method of deriving an average value of a current block.

$$intL = Mean(Prediction) + scale * DC\_coeff \qquad [\text{Equation 9}]$$

A scale value for a DC coefficient may be a fixed value or a variable which is determined dependent on a size of a current block.

In Equation 9, Mean (prediction) represents an average value of prediction samples.

If an average value of a current block is calculated, a quantization parameter difference value of the current block may be determined based on the average value of the current block (S2420). The quantization parameter difference value may be derived by referring to a look up table (LUT) that defines a relationship between the average value and the quantization parameter difference value.

Here, the look-up table may be defined so that a small number of bits are used in a dark portion of a picture (i.e., using a large quantization parameter) and a large number of bits are used in a bright portion of a picture (i.e., using a small quantization parameter). Accordingly, as an average value of a current block increases, a quantization parameter difference value may tend to decrease.

For example, Table 7 illustrates a look-up table that defines a quantization parameter difference value according to an average value.

TABLE 7

| Range of average value in block | dQP |
|---|---|
| intL < 301 | 3 |
| 301 ≤ intL < 367 | 2 |
| 367 ≤ intL < 434 | 1 |
| 434 ≤ intL < 501 | 0 |
| 501 ≤ intL < 567 | −1 |
| 567 ≤ intL < 634 | −2 |
| 634 ≤ intL < 701 | −3 |
| 701 ≤ intL < 767 | −4 |
| 767 ≤ intL < 834 | −5 |
| intL >= 834 | −6 |

In Table 7, intL denotes an average value, and dQp denotes a quantization parameter difference value.

A lookup table referred to for deriving a quantization parameter difference value may be determined according to a size of a current block. For example, a look-up table to be used for deriving a quantization parameter difference value may be adaptively determined according to a size of a coding tree unit, a coding unit, a transform unit, or a prediction unit.

Taking a coding tree unit as an example, there is a possibility that a region including a coding tree unit having a small size may have more complex texture or more object than a region including a coding tree unit having a large size. On the other hand, a region including a coding tree unit having a large size may be more homogeneous region that comprise simple texture or background than a region including a coding tree unit having a small size. Accordingly, subjective image quality may be enhanced and encoding performance may be improved by allocating more bits to a small coding tree unit likely to have a lot of complex textures (i.e., using a small quantization parameter).

To this end, by using different look-up tables depending on a size of a coding tree unit, a small size coding tree unit may have a small quantization parameter difference value and a large size coding tree unit may have a large quantization parameter difference value. For example, if a size of a coding tree unit is larger than 32×32, a lookup table of Table 8 below is used, and if a size of a coding tree unit is smaller than 32×32, a lookup table of Table 7 may be used.

TABLE 8

| Range of average value in block | dQP |
|---|---|
| intL < 401 | 3 |
| 401 ≤ intL < 434 | 2 |
| 434 ≤ intL < 501 | 1 |
| 501 ≤ intL < 567 | 0 |
| 567 ≤ intL < 634 | −1 |
| 634 ≤ intL < 701 | −2 |
| 701 ≤ intL < 767 | −3 |
| 767 ≤ intL < 834 | −4 |
| 834 ≤ intL < 902 | −5 |
| intL >= 902 | −6 |

As another example, a lookup table referred to for deriving a quantization parameter difference value may be determined according to a prediction mode of a current block. For example, a lookup table to be used to derive a quantization parameter difference value may be adaptively determined, depending on whether a coding unit is coded in an intra prediction mode, coded in an inter prediction mode, or coded in an intra block copy.

For example, when a coding unit is coded in intra prediction, a quantization parameter difference value may be derived by using a look-up table in Table 7. And, when a coding unit is coded in an inter prediction mode or an intra block copy, a quantization parameter difference value may be derived by using a look-up table in Table 8.

As another example, a lookup table referred to for deriving a quantization parameter difference value may be determined according to a transform type of a current block or a transform set of a current block. For example, when a transform type of a transform unit is DCT, a quantization parameter difference value may be derived by using a lookup table in Table 7. And, when a transform type of a transform unit is DST, a quantization parameter difference value may be derived by using a lookup table in Table 8.

As another example, a lookup table referred to for deriving a quantization parameter difference value may be determined depending on whether a second transform is performed on a current block. For example, when a second transform is applied to a transform unit, a quantization parameter difference value may be derived by using a lookup table in Table 7. And, when a second transform is not applied to a transform unit, a quantization parameter difference value may be derived by using a lookup table in Table 8.

As another example, a lookup table referred to for deriving a quantization parameter difference value may be determined based on a maximum pixel value, a minimum pixel value, or a difference between the maximum pixel value and the minimum pixel value in a current block. For example, when a maximum pixel value in a coding tree unit is smaller than a specific threshold value, a quantization parameter difference value may be derived by using a lookup table in Table 7. And, when a maximum pixel value in the coding tree unit is larger than a specific threshold value, a quantization parameter difference value may be derived by using a lookup table in Table 8.

In the above example, it is described that a quantization parameter residual value is determined by using an average value of a current block, and it is also described that the average value is determined by a prediction sample and a DC coefficient of the current block. Unlike the description, a quantization parameter residual value may be determined by a prediction sample or a DC coefficient. Alternatively, a prediction sample may be determined based on an average value of a current block, and the average value of the current block may be calculated based on the transform coefficient, the quantized transform coefficient, and the like instead of the DC coefficient.

In addition, in the above example, it is described about determining a quantization parameter residual value in the encoding process. However, it is also possible to determine the quantization parameter residual value in the decoding process in the same manner as in the encoding process. It is also possible for the encoder to signal information specifying a lookup table used to derive the quantization parameter residual value in the decoder. In this case, the decoder may derive a quantization parameter using a lookup table specified by the information.

As another example, a quantization parameter residual value determined in the encoding process may be signaled to the decoder through a bitstream.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
decoding residual coefficients of a transform block;
performing an inverse-quantization for the residual coefficients of the transform block;
determining whether an inverse-transform is skipped for the transform block or not;
when it is determined that the inverse-transform is not skipped for the transform block, determining a horizontal transform type of the transform block based on a horizontal transform set and a vertical transform type of the transform block based on a vertical transform set; and
obtaining residual samples by performing the inverse: transform on inverse-quantized residual coefficients, the inverse-transform for a horizontal direction being performed based on the horizontal transform type and the inverse-transform for a vertical direction being performed based on the vertical transform type,
wherein the horizontal transform type is determined among at least one horizontal transform type candidate included in the horizontal transform set and the vertical transform type is determined among at least one vertical transform type candidate included in the vertical transform set,
wherein each of the at least one horizontal transform type candidate and the at least one vertical transform type candidate comprises at least one of DCT-II, DCT-VIII or DST-VII, and
wherein a number or a type of the at least one horizontal transform type candidate or the at least one vertical transform type candidate is different between when a coding block including the transform block is partitioned vertically and when the coding block is partitioned horizontally.

2. The method of claim 1, wherein whether a horizontal partitioning type or a vertical partitioning type is available to the coding block or not is determined based on a size or a shape of the coding block.

3. The method of claim 2, wherein if the coding block has an N×2N shape, the vertical partitioning type is unavailable to the coding block while the horizontal partitioning type is available to the coding block, the N being an integer of 4, 8 or 16.

4. A method of encoding a video, the method comprising:
determining whether a transform is skipped for a transform block or not;
determining a horizontal transform type of the transform block and a vertical transform type of the transform block;
obtaining transform coefficients by performing the transform on residual samples, the transform for a horizontal direction being performed based on the horizontal transform type and the transform for a vertical direction being performed based on the vertical transform type; and
performing a quantization on the transform coefficients,
wherein the horizontal transform type is determined among at least one horizontal transform type candidate included in a horizontal transform set and the vertical transform type is determined among at least one vertical transform type candidate included in a vertical transform set,
wherein each of the at least one horizontal transform type candidate and the at least one vertical transform type candidate comprises at least one of DCT-II, DCT-VIII or DST-VII, and
wherein a number or a type of the at least one horizontal transform type candidate or the at least one vertical transform type candidate is different between when a coding block including the transform block is partitioned into vertically and when the coding block is partitioned horizontally.

5. The method of claim 4, wherein whether a horizontal partitioning type or a vertical partitioning type is available to the coding block or not is determined based on a size or a shape of the coding block.

6. The method of claim 5, wherein if the coding block has an N×2N shape, the vertical partitioning type is unavailable to the coding block while the horizontal partitioning type is available to the coding block, the N being an integer of 4, 8 or 16.

7. A non-transitory computer-readable medium for storing compressed data associated with a video signal, the compressed data comprising:
residual coefficients of a transform block,
wherein inverse-quantized residual coefficients of the transform block are obtained by performing an inverse-quantization on the residual coefficients of the transform block,
wherein
when it is determined that an inverse-transform is not skipped for the transform block, a horizontal transform type of the transform block and a vertical transform type of the transform block are determined,
wherein residual samples of the transform block are obtained by performing the inverse-transform on the inverse-quantized residual coefficients, the inverse-transform for a horizontal direction being performed based on the horizontal transform type and the inverse-transform for a vertical direction being performed based on the vertical transform type,
wherein the horizontal transform type is determined among at least one horizontal transform type candidate included in a horizontal transform set and the vertical transform type is determined among at least one vertical transform type candidate included in a vertical transform set, wherein each of the at least one horizontal transform type candidate and the at least one vertical transform type candidate comprises at least one of DCT-II, DCT-VIII or DST-VII, and wherein a number or a type of the at least one horizontal transform type candidate or the at least one vertical transform type candidate is different between when a coding block including the transform block is partitioned vertically and when the coding block is partitioned horizontally.

* * * * *

UNITED STATES PATENT AND TRADEMARK OFFICE
CERTIFICATE OF CORRECTION

PATENT NO. : 11,343,497 B2
APPLICATION NO. : 17/123496
DATED : May 24, 2022
INVENTOR(S) : Bae Keun Lee It is certified that error appears in the above-identified patent and that said Letters Patent is hereby corrected as shown below:

In the Claims

In Claim 1, Column 39, Line 40-41, please replace "inverse: transform" with --inverse-transform--;

In Claim 4, Column 40, Line 31, please replace "into vertically and" with --vertically and--.

Signed and Sealed this
Nineteenth Day of July, 2022

Katherine Kelly Vidal
*Director of the United States Patent and Trademark Office*